(12) United States Patent
Xue et al.

(10) Patent No.: US 11,575,490 B2
(45) Date of Patent: Feb. 7, 2023

(54) BANDWIDTH PART BWP PROCESSING METHOD AND DEVICE

(71) Applicant: HUAWEI TECHNOLOGIES CO., LTD., Shenzhen (CN)

(72) Inventors: Yifan Xue, Beijing (CN); Chuting Yao, Beijing (CN); Yiru Kuang, Beijing (CN); Da Wang, Shenzhen (CN); Yun Liu, Shenzhen (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 112 days.

(21) Appl. No.: 16/958,370

(22) PCT Filed: Jan. 10, 2019

(86) PCT No.: PCT/CN2019/071192
§ 371 (c)(1),
(2) Date: Jun. 26, 2020

(87) PCT Pub. No.: WO2019/137442
PCT Pub. Date: Jul. 18, 2019

(65) Prior Publication Data
US 2021/0091914 A1     Mar. 25, 2021

(30) Foreign Application Priority Data
Jan. 12, 2018  (CN) .......................... 201810031967.4

(51) Int. Cl.
*H04L 5/00*     (2006.01)
*H04W 72/04*    (2009.01)

(52) U.S. Cl.
CPC ............ *H04L 5/0098* (2013.01); *H04L 5/001* (2013.01); *H04L 5/0094* (2013.01);
(Continued)

(58) Field of Classification Search
CPC ..... H04L 5/0098; H04L 5/0094; H04L 5/005; H04L 5/001; H04W 72/042; H04W 72/0453
See application file for complete search history.

(56) References Cited

U.S. PATENT DOCUMENTS

2020/0328867 A1* 10/2020 Shi ...................... H04W 72/042

FOREIGN PATENT DOCUMENTS

CN       105979597 A      9/2016
CN       107295649 A     10/2017
(Continued)

OTHER PUBLICATIONS

R2-1800085 Samsung, "Issues/Corrections for BWP Inactivity Timer Operation", 3GPP TSG-RAN2 AH-1801, Vancouver, Canada, Jan. 22-Jan. 26, 2018, total 4 pages.
(Continued)

*Primary Examiner* — Omar J Ghowrwal
(74) *Attorney, Agent, or Firm* — Hauptman Ham, LLP

(57) ABSTRACT

A bandwidth part processing method includes receiving, by a terminal, a first information and a second information from a network device. The first information indicates that at least one default bandwidth part (BWP) corresponds to at least two active BWPs, the second information indicates that the at least two active BWPs correspond to at least one first timer, and the at least one first timer is useable by the terminal to perform deactivation processing on at least one of the at least two active BWPs. The method further includes performing, by the terminal, deactivation processing on the at least one of the at least two active BWPs, and activation processing on a BWP in the at least one default BWP based on the first and second information, or performing deactivation processing on the at least one of the at least two active BWPs based on the first and second information.

14 Claims, 13 Drawing Sheets

(52) U.S. Cl.
CPC ..... *H04W 72/042* (2013.01); *H04W 72/0453* (2013.01); *H04L 5/005* (2013.01)

(56) References Cited

FOREIGN PATENT DOCUMENTS

| CN | 107396386 A | 11/2017 | | |
|---|---|---|---|---|
| CN | 107493605 A | 12/2017 | | |
| EP | 3571803 B1 | 4/2020 | | |
| WO | 2016163505 A1 | 10/2016 | | |
| WO | WO-2019094781 A2 | * | 5/2019 | ............. H04L 5/001 |

OTHER PUBLICATIONS

R2-1714046 LG Electronics Inc., "TP for BWP", 3GPP TSG-RAN WG2 Meeting #100, Reno, USA, Nov. 27-Dec. 1, 2017, total 5 pages.

R2-1708045 MediaTek Inc., "Fallback mechanism for Bandwidth part operation", 3GPP TSG-RAN WG2 Meeting#99, Berlin, Germany, Aug. 21-25, 2017, total 3 pages.

European Search Report issued in corresponding European Application No. 19738859.8, dated Nov. 20, 2020, pp. 1-16, European Patent Office, Munich, Germany.

RP-1 72760 Kazuaki Takeda,"Status Repod to TSG" ,3GPP TSG RAN meeting #78 ,Lisbon, Portugal, Dec. 18-21, 2017,total 139 pages.

R1-1712870 vivo,"Discussion on the activation/deactivation of the bandwidth part",3GPP TSG RAN WG1 Meeting#90, Prague, Czech Republic, Aug. 21 25, 2017,total 3 pages.

R1-1719301 MCC Support,"Final Repod of 3GPP TSG RAN WG1 #90bis v1.0.0 (Prague, Czech Rep, Oct. 9 13, 2017)",3GPP TSG RAN WG1 Meeting #91,Reno, USA, Nov. 27 Dec. 1, 2017,total 206 pages.

International Search Report issued in corresponding International Application No. PCT/CN2019/071192 dated Apr. 2, 2019, State Intellectual Property Office of the P.R. China, Beijing, China.

R1-1720930 Convida Wireless,"Design Considerations for BWP in NR",3GPP TSG-RAN WG1 Meeting #91,Reno, USA, Nov. 27 Dec. 1, 2017,total 5 pages.

R1-1710583 Intel Corporation,"Open issues for wider bandwidth operations",3GPP TSG RAN WG1 NR Ad-Hoc#2, Qingdao, P.R. China Jun. 27 30, 2017,total 7 pages.

Chinese Office Action issued in corresponding Chinese Application No. 201810031967.4, dated Sep. 3, 2020, State Intellectual Property Office of the P.R. China, Beijing, China.

* cited by examiner

BANDWIDTH PART BWP PROCESSING METHOD AND DEVICE

This application is a National Stage of International Patent Application No. PCT/CN2019/071192 filed on Jan. 10, 2019, which claims priority to Chinese Patent Application No. 201810031967.4, filed on Jan. 12, 2018.

TECHNICAL FIELD

Embodiments of this application relate to the field of communications technologies, and in particular, to a bandwidth part BWP processing method and a device.

BACKGROUND

In 5G new radio (New Radio, NR), a system bandwidth, namely, a bandwidth of a carrier, may become very high (for example, 200 MHz or 400 MHz). However, some terminals have limited capabilities and cannot support a high bandwidth. Therefore, a network device configures a BWP (Bandwidth Part, BWP), namely, a part of the system bandwidth such as 20 MHz for the terminal, and the terminal can communicate with the network device on the BWP.

To reduce power consumption of the terminal, a concept of a BWP fallback (fallback) is further introduced in NR. Specifically, when a terminal is activated on a relatively large BWP, a timer is started to count an activation time corresponding to the relatively large BWP. If downlink control information (downlink control information, DCI) for scheduling the terminal is not received after the timer expires, a probability that the terminal is scheduled by the network device is relatively low. In this case, the terminal is switched (switch) from the BWP to a relatively small BWP, to reduce power consumption. The relatively small BWP is referred to as a default BWP (default BWP). The power consumption is mainly generated during monitoring of the downlink control information. A higher bandwidth indicates a larger range in which the downlink control information needs to be monitored, and causes higher power consumption.

However, when the terminal supports a plurality of activated BWPs, because different BWPs have different activation duration, one timer in the prior art is not applicable. Therefore, how to perform BWP deactivation processing on the plurality of activated BWPs is a technical problem that needs to be urgently resolved currently.

SUMMARY

Embodiments of this application provide a bandwidth part BWP processing method and a device, to provide a BWP deactivation implementation when there are a plurality of active BWPs.

According to a first aspect, an embodiment of this application provides a bandwidth part processing method, including:

receiving, by a terminal, first information and second information that are sent by a network device, where the first information is used to indicate that at least one default bandwidth part BWP each corresponds to at least two active BWPs, to be specific, the first information is used to indicate a correspondence between each of the at least one default BWP and an active BWP, and each default BWP corresponds to at least two active BWPs; in other words, the first information is used to indicate a correspondence between each default BWP and an active BWP, there is at least one default BWP, and each default BWP corresponds to at least two active BWPs; and the second information is used to indicate that the at least two active BWPs correspond to at least one first timer, and the first timer is a timer used by the terminal to perform deactivation processing on at least one of the at least two active BWPs; in other words, the second information is used to indicate a correspondence between a first timer and at least two active BWPs corresponding to each of the at least one default BWP, and if there is the correspondence between a first timer and at least two active BWPs, there is a correspondence between timer duration of the first timer and the at least two active BWPs; and performing, by the terminal, deactivation processing on the at least one of the at least two active BWPs and activation processing on a BWP in the at least one default BWP based on the first information and the second information, or performing deactivation processing on the at least one of the at least two active BWPs based on the first information and the second information.

In a possible implementation, the first information is specifically used to indicate that one default BWP corresponds to at least two active BWPs, and the second information is specifically used to indicate that the active BWPs each correspond to one first timer; and the performing, by the terminal, deactivation processing on the at least one of the at least two active BWPs and activation processing on a BWP in the at least one default BWP based on the first information and the second information, or performing deactivation processing on the at least one of the at least two active BWPs based on the first information and the second information includes:

performing, by the terminal based on the first information and the second information, deactivation processing on an active BWP corresponding to a first timer that expires and activation processing on the default BWP corresponding to the at least two active BWPs, or performing, based on the first information and the second information, deactivation processing on an active BWP corresponding to a first timer that expires.

In a possible implementation, the first information is specifically used to indicate that at least two default BWPs each correspond to at least two active BWPs, and the second information is specifically used to indicate that the active BWPs each correspond to one first timer; and the performing, by the terminal, deactivation processing on the at least one of the at least two active BWPs and activation processing on a BWP in the at least one default BWP based on the first information and the second information, or performing deactivation processing on the at least one of the at least two active BWPs based on the first information and the second information includes:

for at least two active BWPs corresponding to any one of the default BWPs, performing, by the terminal based on the first information and the second information, deactivation processing on an active BWP corresponding to a first timer that expires and activation processing on the default BWP corresponding to the at least two active BWPs, or performing, based on the first information and the second information, deactivation processing on an active BWP corresponding to a first timer that expires.

In a possible implementation, the performing, by the terminal, deactivation processing on an active BWP corresponding to a first timer that expires and activation processing on the default BWP corresponding to the at least two active BWPs includes:

if the active BWP corresponding to the first timer that expires is the last active BWP, performing, by the terminal, deactivation processing on the active BWP corresponding to the first timer that expires and activation processing on the default BWP corresponding to the at least two active BWPs; or if the active BWP corresponding to the first timer that expires is the first active BWP, performing, by the terminal, deactivation processing on the active BWP corresponding to the first timer that expires and activation processing on the default BWP corresponding to the at least two active BWPs.

In a possible implementation, the performing, by the terminal, deactivation processing on an active BWP corresponding to a first timer that expires includes:

if the active BWP corresponding to the first timer that expires is not the last active BWP, performing, by the terminal, deactivation processing on the active BWP corresponding to the first timer that expires; or if the active BWP corresponding to the first timer that expires is not the first active BWP, performing, by the terminal, deactivation processing on the active BWP corresponding to the first timer that expires; or if the default BWP is active, performing, by the terminal, deactivation processing on an active BWP corresponding to each first timer that expires.

In a possible implementation, the first information is specifically used to indicate that at least two default BWPs each correspond to at least two active BWPs, and the second information is specifically used to indicate that at least two active BWPs corresponding to each of the at least one default BWP correspond to one first timer; and the performing, by the terminal, deactivation processing on the at least one of the at least two active BWPs and activation processing on a BWP in the at least one default BWP based on the first information and the second information includes:

for at least two active BWPs corresponding to any one of the default BWPs, performing, by the terminal based on the first information and the second information, deactivation processing on at least two active BWPs corresponding to a first timer that expires and activation processing on the default BWP.

In a possible implementation, the method further includes:

receiving, by the terminal, third information sent by the network device, where the third information is used to indicate that all active BWPs correspond to one second timer, and the second timer is a timer used by the terminal to perform deactivation processing on all active BWPs corresponding to a first timer that does not expire; and the performing, by the terminal, deactivation processing on the at least one of the at least two active BWPs and activation processing on a BWP in the at least one default BWP based on the first information and the second information includes:

when the second timer expires and there is a first timer that does not expire, performing, by the terminal based on the first information, the second information, and the third information, deactivation processing on all active BWPs corresponding to the first timer that does not expire and activation processing on a default BWP corresponding to each of the active BWPs.

In a possible implementation, the method further includes:

receiving, by the terminal, fourth information sent by the network device, where the fourth information is used to indicate that at least two active BWPs corresponding to each default BWP correspond to one second timer, and the second timer is a timer used by the terminal to perform deactivation processing on an active BWP that corresponds to each default BWP and that corresponds to a first timer that does not expire; and the performing, by the terminal, deactivation processing on the at least one of the at least two active BWPs and activation processing on a BWP in the at least one default BWP based on the first information and the second information includes:

for each default BWP, when the second timer expires and there is a first timer that does not expire, performing, by the terminal based on the first information, the second information, and the third information, deactivation processing on all active BWPs corresponding to the first timer that does not expire and activation processing on the default BWP.

According to a second aspect, this application provides a bandwidth part processing method, including:

receiving, by a terminal, first information sent by a network device, where the first information is used to indicate that at least two active BWPs correspond to at least one first timer; and setting, by the terminal, a value of a first timer that does not expire to an initial value based on the first information.

In a possible implementation, the active BWPs each correspond to one first timer, and the setting, by the terminal, a value of a first timer that does not expire to an initial value based on the first information includes:

for any one of the active BWPs, if the terminal receives downlink control information DCI on the active BWP corresponding to a first timer that does not expire, setting, by the terminal, a value of the first timer that does not expire to an initial value based on the first information; or for any one of the active BWPs, if the terminal receives downlink control information DCI on the active BWP corresponding to a first timer that does not expire, setting, by the terminal, values of all first timers to initial values based on the first information.

In a possible implementation, the method further includes:

receiving, by the terminal, second information sent by the network device, where the second information is used to indicate that at least one default bandwidth part BWP each corresponds to at least two active BWPs, and the first information is specifically used to indicate that the at least two active BWPs corresponding to the default BWP correspond to at least one first timer; and the setting, by the terminal, a value of a first timer that does not expire to an initial value based on the first information includes:

setting, by the terminal, a value of a first timer that does not expire in the at least one first timer corresponding to the at least two active BWPs corresponding to the default BWP, to an initial value based on the first information and the second information.

In a possible implementation, the first information is specifically used to indicate that the active BWPs each correspond to one first timer; and the setting, by the terminal, a value of a first timer that does not expire in the at least one first timer corresponding to the at least two active BWPs corresponding to the default BWP, to an initial value based on the first information and the second information includes:

for any one of the active BWPs, if the terminal receives downlink control information DCI on the active BWP corresponding to a first timer that does not expire, setting, by the terminal, a value of the first timer that does not expire to an initial value based on the first information and the second information; or for any one of the active BWPs, if the terminal receives downlink control information DCI on the active BWP corresponding to a first timer that does not expire, setting, by the terminal, values of all first timers corresponding to the at least two active BWPs corresponding to the default BWP, to initial values based on the first information and the second information.

In a possible implementation, the first information is specifically used to indicate that at least two active BWPs corresponding to each of the default BWP correspond to one first timer; and the setting, by the terminal, a value of a first timer that does not expire in the at least one first timer corresponding to the at least two active BWPs corresponding to the default BWP, to an initial value based on the first information and the second information includes:

for any one of the active BWPs, if the terminal receives downlink control information DCI on the active BWP corresponding to a first timer that does not expire, setting, by the terminal, a value of the first timer corresponding to the at least two active BWPs corresponding to the default BWP, to an initial value based on the first information and the second information.

In a possible implementation, the method further includes:

receiving, by the terminal, third information sent by the network device, where the third information is used to indicate that all active BWPs correspond to one second timer; and if the terminal receives, before the second timer expires, downlink control information DCI on any one of the active BWPs corresponding to the second timer, setting, by the terminal, a value of the second timer to an initial value based on the third information.

In a possible implementation, the method further includes:

receiving, by the terminal, fourth information sent by the network device, where the fourth information is used to indicate that at least two active BWPs corresponding to each default BWP correspond to one second timer; and if the terminal receives, before the second timer expires, downlink control information DCI on any one of the active BWPs corresponding to the second timer, setting, by the terminal, a value of the second timer to an initial value based on the fourth information.

According to a third aspect, an embodiment of this application provides a bandwidth part processing method, including:

sending, by a network device, first information and second information to a terminal, where the first information is used to indicate that at least one default bandwidth part BWP each corresponds to at least two active BWPs, the second information is used to indicate that the at least two active BWPs correspond to at least one first timer, and the first timer is a timer used by the network device to determine a BWP to be deactivated by the terminal in the at least two active BWPs; and determining, by the network device based on the first information and the second information, a BWP to be deactivated by the terminal in the at least two active BWPs and a BWP to be activated by the terminal in the at least one default BWP, or determining, based on the first information and the second information, a BWP to be deactivated by the terminal in the at least two active BWPs.

In a possible implementation, the first information is specifically used to indicate that one default BWP corresponds to at least two active BWPs, and the second information is specifically used to indicate that the active BWPs each correspond to one first timer; and the determining, by the network device based on the first information and the second information, a BWP to be deactivated by the terminal in the at least two active BWPs and a BWP to be activated by the terminal in the at least one default BWP, or determining, based on the first information and the second information, a BWP to be deactivated by the terminal in the at least two active BWPs includes:

determining, by the network device based on the first information and the second information, that an active BWP corresponding to a first timer that expires is a to-be-deactivated BWP and the default BWP corresponding to the at least two active BWPs is a to-be-activated BWP, or determining, based on the first information and the second information, that an active BWP corresponding to a first timer that expires is a to-be-deactivated BWP.

In a possible implementation, the first information is specifically used to indicate that at least two default BWPs each correspond to at least two active BWPs, and the second information is specifically used to indicate that the active BWPs each correspond to one first timer; and the determining, by the network device based on the first information and the second information, a BWP to be deactivated by the terminal in the at least two active BWPs and a BWP to be activated by the terminal in the at least one default BWP, or determining, based on the first information and the second information, a BWP to be deactivated by the terminal in the at least two active BWPs includes:

for at least two active BWPs corresponding to any one of the default BWPs, determining, by the network device based on the first information and the second information, that an active BWP corresponding to a first timer that expires is a to-be-deactivated BWP and the default BWP corresponding to the at least two active BWPs is a to-be-activated BWP, or determining, based on the first information and the second information, that an active BWP corresponding to a first timer that expires is a to-be-deactivated BWP.

In a possible implementation, the determining, by the network device, that an active BWP corresponding to a first timer that expires is a to-be-deactivated BWP and the default BWP corresponding to the at least two active BWPs is a to-be-activated BWP includes:

if the active BWP corresponding to the first timer that expires is the last active BWP, determining, by the network device, that the active BWP corresponding to the first timer that expires is the to-be-deactivated BWP and the default BWP corresponding to the at least two active BWPs is the to-be-activated BWP; or if the active BWP corresponding to the first timer that expires is the first active BWP, determining, by the network device, that the active BWP corresponding to the first timer that expires is the to-be-deactivated BWP and the default BWP corresponding to the at least two active BWPs is the to-be-activated BWP.

In a possible implementation, the determining, by the network device, that an active BWP corresponding to a first timer that expires is a to-be-deactivated BWP includes:

if the active BWP corresponding to the first timer that expires is not the last active BWP, determining, by the network device, that the active BWP corresponding to the first timer that expires is the to-be-deactivated BWP;

if the active BWP corresponding to the first timer that expires is not the first active BWP, determining, by the network device, that the active BWP corresponding to the first timer that expires is the to-be-deactivated BWP; or if the default BWP is active, determining, by the network device, that an active BWP corresponding to each first timer that expires is a to-be-deactivated BWP.

In a possible implementation, the first information is specifically used to indicate that at least two default BWPs each correspond to at least two active BWPs, and the second information is specifically used to indicate that at least two active BWPs corresponding to each of the at least one default BWP correspond to one first timer; and the determining, by the network device based on the first information and the second information, a BWP to be deactivated by the terminal in the at least two active BWPs and a BWP to be activated by the terminal in the at least one default BWP includes:

for at least two active BWPs corresponding to any one of the default BWPs, determining, by the network device based on the first information and the second information, that at least two active BWPs corresponding to a first timer that expires are to-be-activated BWPs and the default BWP is a to-be-activated BWP.

In a possible implementation, the method further includes:

sending, by the network device, third information to the terminal, where the third information is used to indicate that all active BWPs correspond to one second timer, and the second timer is a timer used by the network device to determine a BWP to be deactivated by the terminal in all the active BWPs; and the determining, by the network device based on the first information and the second information, a BWP to be deactivated by the terminal in the at least two active BWPs and a BWP to be activated by the terminal in the at least one default BWP includes:

when the second timer expires and there is a first timer that does not expire, determining, by the network device based on the first information, the second information, and the third information, that all active BWPs corresponding to the first timer that does not expire are to-be-deactivated BWPs and a default BWP corresponding to each of the active BWPs is a to-be-activated BWP.

In a possible implementation, the method further includes:

sending, by the network device, fourth information to the terminal, where the fourth information is used to indicate that at least two active BWPs corresponding to each default BWP correspond to one second timer, and the second timer is a timer used by the network device to determine a BWP to be deactivated by the terminal in the at least two active BWPs corresponding to each default BWP; and the determining, by the network device based on the first information, the second information, and the third information, a BWP to be deactivated by the terminal in the at least two active BWPs and a BWP to be activated by the terminal in the at least one default BWP includes:

for each default BWP, when the second timer expires and there is a first timer that does not expire, determining, by the network device based on the first information, the second information, and the third information, that all active BWPs corresponding to the first timer that does not expire are to-be-deactivated BWPs and the default BWP is a to-be-activated BWP.

According to a fourth aspect, an embodiment of this application provides a bandwidth part processing method, including:

sending, by a network device, first information to a terminal, where the first information is used to indicate that at least two active BWPs correspond to at least one first timer; and setting, by the network device, a value of a first timer that does not expire to an initial value based on the first information.

In a possible implementation, the active BWPs each correspond to one first timer, and the setting, by the network device, a value of a first timer that does not expire to an initial value based on the first information includes:

for any one of the active BWPs, if the network device sends downlink control information DCI on the active BWP corresponding to a first timer that does not expire, setting, by the network device, a value of the first timer that does not expire to an initial value based on the first information; or for any one of the active BWPs, if the network device sends downlink control information DCI on the active BWP corresponding to a first timer that does not expire, setting, by the network device, values of all first timers to initial values based on the first information.

In a possible implementation, the method further includes:

sending, by the network device, second information to the terminal, where the second information is used to indicate that at least one default bandwidth part BWP each corresponds to at least two active BWPs, and the first information is specifically used to indicate that the at least two active BWPs corresponding to the default BWP correspond to at least one first timer; and the setting, by the network device, a value of a first timer that does not expire to an initial value based on the first information includes:

setting, by the network device, a value of a first timer that does not expire in the at least one first timer corresponding to the at least two active BWPs corresponding to the default BWP, to an initial value based on the first information and the second information.

In a possible implementation, the first information is specifically used to indicate that the active BWPs each correspond to one first timer; and the setting, by the network device, a value of a first timer that does not expire in the at least one first timer corresponding to the at least two active BWPs corresponding to the default BWP, to an initial value based on the first information and the second information includes:

for any one of the active BWPs, if the network device sends downlink control information DCI on the active BWP corresponding to a first timer that does not expire, setting, by the network device, a value of the first timer that does not expire to an initial value based on the first information and the second information; or for any one of the active BWPs, if the network device sends downlink control information DCI on the active BWP corresponding to a first timer that does not expire, setting, by the network device, values of all first timers corresponding to the at least two active BWPs corresponding to the default BWP, to initial values based on the first information and the second information.

In a possible implementation, the first information is specifically used to indicate that at least two active BWPs corresponding to each of the default BWP correspond to one first timer; and the setting, by the network device, a value of a first timer that does not expire in the at least one first timer corresponding to the at least two active BWPs corresponding to the default BWP, to an initial value based on the first information and the second information includes:

for any one of the active BWPs, if the network device sends downlink control information DCI on the active BWP corresponding to a first timer that does not expire, setting, by the network device, a value of the first timer corresponding to the at least two active BWPs corresponding to the default BWP, to an initial value based on the first information and the second information.

In a possible implementation, the method further includes:

sending, by the network device, third information to the terminal, where the third information is used to indicate that all active BWPs correspond to one second timer; and if the network device sends, before the second timer expires, downlink control information DCI on any one of the active BWPs corresponding to the second timer, setting, by the network device, a value of the second timer to an initial value based on the third information.

In a possible implementation, the method further includes:

sending, by the network device, fourth information to the terminal, where the fourth information is used to indicate that at least two active BWPs corresponding to each default BWP correspond to one second timer; and if the network device sends, before the second timer expires, downlink control information DCI on any one of the active BWPs corresponding to the second timer, setting, by the network device, a value of the second timer to an initial value based on the fourth information.

According to a fifth aspect, an embodiment of this application provides a terminal, including:

a receiving module, configured to receive first information and second information that are sent by a network device, where the first information is used to indicate that at least one default bandwidth part BWP each corresponds to at least two active BWPs, the second information is used to indicate that the at least two active BWPs correspond to at least one first timer, and the first timer is a timer used by the terminal to perform deactivation processing on at least one of the at least two active BWPs; and a processing module, configured to: perform deactivation processing on the at least one of the at least two active BWPs and activation processing on a BWP in the at least one default BWP based on the first information and the second information, or perform deactivation processing on the at least one of the at least two active BWPs based on the first information and the second information.

In a possible implementation, the first information is specifically used to indicate that one default BWP corresponds to at least two active BWPs, and the second information is specifically used to indicate that the active BWPs each correspond to one first timer; and the processing module is specifically configured to: perform, based on the first information and the second information, deactivation processing on an active BWP corresponding to a first timer that expires and activation processing on the default BWP corresponding to the at least two active BWPs, or perform, based on the first information and the second information, deactivation processing on an active BWP corresponding to a first timer that expires.

In a possible implementation, the first information is specifically used to indicate that at least two default BWPs each correspond to at least two active BWPs, and the second information is specifically used to indicate that the active BWPs each correspond to one first timer; and the processing module is specifically configured to: for at least two active BWPs corresponding to any one of the default BWPs, perform, based on the first information and the second information, deactivation processing on an active BWP corresponding to a first timer that expires and activation processing on the default BWP corresponding to the at least two active BWPs, or perform, based on the first information and the second information, deactivation processing on an active BWP corresponding to a first timer that expires.

In a possible implementation, the processing module is specifically configured to:

if the active BWP corresponding to the first timer that expires is the last active BWP, perform deactivation processing on the active BWP corresponding to the first timer that expires and activation processing on the default BWP corresponding to the at least two active BWPs; or if the active BWP corresponding to the first timer that expires is the first active BWP, perform deactivation processing on the active BWP corresponding to the first timer that expires and activation processing on the default BWP corresponding to the at least two active BWPs.

In a possible implementation, the processing module is specifically configured to:

if the active BWP corresponding to the first timer that expires is not the last active BWP, perform deactivation processing on the active BWP corresponding to the first timer that expires; or if the active BWP corresponding to the first timer that expires is not the first active BWP, perform deactivation processing on the active BWP corresponding to the first timer that expires; or if the default BWP is active, perform deactivation processing on an active BWP corresponding to each first timer that expires.

In a possible implementation, the first information is specifically used to indicate that at least two default BWPs each correspond to at least two active BWPs, and the second information is specifically used to indicate that at least two active BWPs corresponding to each of the at least one default BWP correspond to one first timer; and the processing module is specifically configured to: for at least two active BWPs corresponding to any one of the default BWPs, perform, based on the first information and the second information, deactivation processing on at least two active BWPs corresponding to a first timer that expires and activation processing on the default BWP.

In a possible implementation, the receiving module is further configured to receive third information sent by the network device, where the third information is used to indicate that all active BWPs correspond to one second timer, and the second timer is a timer used by the terminal to perform deactivation processing on all active BWPs corresponding to a first timer that does not expire; and the processing module is specifically configured to: when the second timer expires and there is a first timer that does not expire, perform, based on the first information, the second information, and the third information, deactivation processing on all active BWPs corresponding to the first timer that does not expire and activation processing on a default BWP corresponding to each of the active BWPs.

In a possible implementation, the receiving module is further configured to receive fourth information sent by the network device, where the fourth information is used to indicate that at least two active BWPs corresponding to each default BWP correspond to one second timer, and the second timer is a timer used by the terminal to perform deactivation processing on an active BWP that corresponds to each default BWP and that corresponds to a first timer that does not expire; and the processing module is specifically configured to: for each default BWP, when the second timer expires and there is a first timer that does not expire, perform, based on the first information, the second information, and the third information, deactivation processing on all active BWPs corresponding to the first timer that does not expire and activation processing on the default BWP.

According to a sixth aspect, an embodiment of this application provides a terminal, including:

a receiving module, configured to receive first information sent by a network device, where the first information is used to indicate that at least two active BWPs correspond to at least one first timer; and a processing module, configured to set a value of a first timer that does not expire to an initial value based on the first information.

In a possible implementation, the active BWPs each correspond to one first timer; and the processing module is specifically configured to:

for any one of the active BWPs, if the terminal receives downlink control information DCI on the active BWP corresponding to a first timer that does not expire, set a value of the first timer that does not expire to an initial value based on the first information; or for any one of the active BWPs, if the terminal receives downlink control information DCI on the active BWP corresponding to a first timer that does not expire, set values of all first timers to initial values based on the first information.

In a possible implementation, the receiving module is further configured to receive second information sent by the network device, where the second information is used to indicate that at least one default bandwidth part BWP each corresponds to at least two active BWPs, and the first information is specifically used to indicate that the at least two active BWPs corresponding to the default BWP correspond to at least one first timer; and the processing module is specifically configured to set a value of a first timer that does not expire in the at least one first timer corresponding to the at least two active BWPs corresponding to the default BWP, to an initial value based on the first information and the second information.

In a possible implementation, the first information is specifically used to indicate that the active BWPs each correspond to one first timer; and the processing module is specifically configured to:

for any one of the active BWPs, if the terminal receives downlink control information DCI on the active BWP corresponding to a first timer that does not expire, set a value of the first timer that does not expire to an initial value based on the first information and the second information; or for any one of the active BWPs, if the terminal receives downlink control information DCI on the active BWP corresponding to a first timer that does not expire, set values of all first timers corresponding to the at least two active BWPs corresponding to the default BWP, to initial values based on the first information and the second information.

In a possible implementation, the first information is specifically used to indicate that at least two active BWPs corresponding to each of the default BWP correspond to one first timer; and the processing module is specifically configured to: for any one of the active BWPs, if the terminal receives downlink control information DCI on the active BWP corresponding to a first timer that does not expire, set a value of the first timer corresponding to the at least two active BWPs corresponding to the default BWP, to an initial value based on the first information and the second information.

In a possible implementation, the receiving module is further configured to receive third information sent by the network device, where the third information is used to indicate that all active BWPs correspond to one second timer; and the processing module is further configured to: if the terminal receives, before the second timer expires, downlink control information DCI on any one of the active BWPs corresponding to the second timer, set a value of the second timer to an initial value based on the third information.

In a possible implementation, the receiving module is further configured to receive fourth information sent by the network device, where the fourth information is used to indicate that at least two active BWPs corresponding to each default BWP correspond to one second timer; and the processing module is further configured to: if the terminal receives, before the second timer expires, downlink control information DCI on any one of the active BWPs corresponding to the second timer, set a value of the second timer to an initial value based on the fourth information.

According to a seventh aspect, an embodiment of this application provides a network device, including:

a sending module, configured to send first information and second information to a terminal, where the first information is used to indicate that at least one default bandwidth part BWP each corresponds to at least two active BWPs, the second information is used to indicate that the at least two active BWPs correspond to at least one first timer, and the first timer is a timer used by the network device to determine a BWP to be deactivated by the terminal in the at least two active BWPs; and a processing module, configured to: determine, based on the first information and the second information, a BWP to be deactivated by the terminal in the at least two active BWPs and a BWP to be activated by the terminal in the at least one default BWP, or determine, based on the first information and the second information, a BWP to be deactivated by the terminal in the at least two active BWPs.

In a possible implementation, the first information is specifically used to indicate that one default BWP corresponds to at least two active BWPs, and the second information is specifically used to indicate that the active BWPs each correspond to one first timer; and the processing module is specifically configured to: determine, based on the first information and the second information, that an active BWP corresponding to a first timer that expires is a to-be-deactivated BWP and the default BWP corresponding to the at least two active BWPs is a to-be-activated BWP, or determine, based on the first information and the second information, that an active BWP corresponding to a first timer that expires is a to-be-deactivated BWP.

In a possible implementation, the first information is specifically used to indicate that at least two default BWPs each correspond to at least two active BWPs, and the second information is specifically used to indicate that the active BWPs each correspond to one first timer; and the processing module is specifically configured to: for at least two active BWPs corresponding to any one of the default BWPs, determine, based on the first information and the second information, that an active BWP corresponding to a first timer that expires is a to-be-deactivated BWP and the default BWP corresponding to the at least two active BWPs is a to-be-activated BWP, or determine, based on the first information and the second information, that an active BWP corresponding to a first timer that expires is a to-be-deactivated BWP.

In a possible implementation, the processing module is specifically configured to:

if the active BWP corresponding to the first timer that expires is the last active BWP, determine that the active BWP corresponding to the first timer that expires is the to-be-deactivated BWP and the default BWP corresponding to the at least two active BWPs is the to-be-activated BWP; or if the active BWP corresponding to the first timer that expires is the first active BWP, determine that the active BWP corresponding to the first timer that expires is the to-be-deactivated BWP and the default BWP corresponding to the at least two active BWPs is the to-be-activated BWP.

In a possible implementation, the processing module is specifically configured to:

if the active BWP corresponding to the first timer that expires is not the last active BWP, determine that the active BWP corresponding to the first timer that expires is the to-be-deactivated BWP; or if the active BWP corresponding to the first timer that expires is not the first active BWP, determine that the active BWP corresponding to the first timer that expires is the to-be-deactivated BWP; or if the default BWP is active, determine that an active BWP corresponding to each first timer that expires is a to-be-deactivated BWP.

In a possible implementation, the first information is specifically used to indicate that at least two default BWPs each correspond to at least two active BWPs, and the second information is specifically used to indicate that at least two active BWPs corresponding to each of the at least one default BWP correspond to one first timer; and the processing module is specifically configured to: for at least two active BWPs corresponding to any one of the default BWPs, determine, based on the first information and the second information, that at least two active BWPs corresponding to a first timer that expires are to-be-activated BWPs and the default BWP is a to-be-activated BWP.

In a possible implementation, the sending module is further configured to send third information to the terminal, where the third information is used to indicate that all active BWPs correspond to one second timer, and the second timer is a timer used by the network device to determine a BWP to be deactivated by the terminal in all the active BWPs; and the processing module is specifically configured to: when the second timer expires and there is a first timer that does not expire, determine, based on the first information, the second information, and the third information, that all active BWPs corresponding to the first timer that does not expire are to-be-deactivated BWPs and a default BWP corresponding to each of the active BWPs is a to-be-activated BWP.

In a possible implementation, the sending module is further configured to send fourth information to the terminal, where the fourth information is used to indicate that at least two active BWPs corresponding to each default BWP correspond to one second timer, and the second timer is a timer used by the network device to determine a BWP to be deactivated by the terminal in the at least two active BWPs corresponding to each default BWP; and the processing module is specifically configured to: for each default BWP, when the second timer expires and there is a first timer that does not expire, determine, based on the first information, the second information, and the third information, that all active BWPs corresponding to the first timer that does not expire are to-be-deactivated BWPs and the default BWP is a to-be-activated BWP.

According to an eighth aspect, an embodiment of this application provides a network device, including:

a sending module, configured to send first information to a terminal, where the first information is used to indicate that at least two active BWPs correspond to at least one first timer; and a processing module, configured to set a value of a first timer that does not expire to an initial value based on the first information.

In a possible implementation, the processing module is specifically configured to:

for any one of the active BWPs, if the network device sends downlink control information DCI on the active BWP corresponding to a first timer that does not expire, set a value of the first timer that does not expire to an initial value based on the first information; or for any one of the active BWPs, if the network device sends downlink control information DCI on the active BWP corresponding to a first timer that does not expire, set values of all first timers to initial values based on the first information.

In a possible implementation, the sending module is further configured to send second information to the terminal, where the second information is used to indicate that at least one default bandwidth part BWP each corresponds to at least two active BWPs, and the first information is specifically used to indicate that the at least two active BWPs corresponding to the default BWP correspond to at least one first timer; and the processing module is specifically configured to set a value of a first timer that does not expire in the at least one first timer corresponding to the at least two active BWPs corresponding to the default BWP, to an initial value based on the first information and the second information.

In a possible implementation, the first information is specifically used to indicate that the active BWPs each correspond to one first timer; and the processing module is specifically configured to: for any one of the active BWPs, if the network device sends downlink control information DCI on the active BWP corresponding to a first timer that does not expire, set a value of the first timer that does not expire to an initial value based on the first information and the second information; or for any one of the active BWPs, if the network device sends downlink control information DCI on the active BWP corresponding to a first timer that does not expire, set values of all first timers corresponding to the at least two active BWPs corresponding to the default BWP, to initial values based on the first information and the second information.

In a possible implementation, the first information is specifically used to indicate that at least two active BWPs corresponding to each of the default BWP correspond to one first timer; and the processing module is specifically configured to: for any one of the active BWPs, if the network device sends downlink control information DCI on the active BWP corresponding to a first timer that does not expire, set a value of the first timer corresponding to the at least two active BWPs corresponding to the default BWP, to an initial value based on the first information and the second information.

In a possible implementation, the sending module is further configured to send third information to the terminal, where the third information is used to indicate that all active BWPs correspond to one second timer; and the processing module is further configured to: if the network device sends, before the second timer expires, downlink control information DCI on any one of the active BWPs corresponding to the second timer, set a value of the second timer to an initial value based on the third information.

In a possible implementation, the sending module is further configured to send fourth information to the terminal, where the fourth information is used to indicate that at least two active BWPs corresponding to each default BWP correspond to one second timer; and the processing module is further configured to: if the network device sends, before the second timer expires, downlink control information DCI on any one of the active BWPs corresponding to the second timer, set a value of the second timer to an initial value based on the fourth information.

According to a ninth aspect, an embodiment of this application provides a BWP processing method, including:

determining, by a terminal, a transmission status of an active BWP in a first time range, where the transmission status is a size of a transport block corresponding to service data transmitted on the active BWP; and determining, by the terminal based on the transmission status, whether to perform deactivation processing on the active BWP.

In a possible implementation, the determining, by the terminal based on the transmission status, whether to perform deactivation processing on the active BWP includes:

obtaining, by the terminal, a size of a largest transport block in the first time range, determining, by the terminal, whether the size of the largest transport block is less than a first threshold, and performing, by the terminal, deactivation processing on the active BWP if the size of the largest transport block is less than the first threshold.

In another possible implementation, the determining, by the terminal based on the transmission status, whether to perform deactivation processing on the active BWP includes:

obtaining, by the terminal, an average size of a plurality of transport blocks in the first time range, determining, by the terminal, whether the average size is less than a second threshold, and performing, by the terminal, deactivation processing on the active BWP if the average size is less than the second threshold.

According to a tenth aspect, an embodiment of this application provides a BWP processing method, including:

determining, by a network device, a transmission status of an active BWP in a first time range, where the transmission status is a size of a transport block corresponding to service data transmitted on the active BWP; and determining, by the network device based on the transmission status, whether a terminal performs deactivation processing on the active BWP.

In a possible implementation, the determining, by the network device based on the transmission status, whether a terminal performs deactivation processing on the active BWP includes:

obtaining, by the network device, a size of a largest transport block in the first time range, determining, by the network device, whether the size of the largest transport block is less than a first threshold, and if the size of the largest transport block is less than the first threshold, determining, by the network device, that the active BWP is a to-be-deactivated BWP.

In another possible implementation, the network device obtains an average size of a plurality of transport blocks in the first time range, the network device determines whether the average size is less than a second threshold, and if the average size is less than the second threshold, the network device determines that the active BWP is a to-be-deactivated BWP.

According to an eleventh aspect, an embodiment of this application provides a terminal, including a receiver and a processor, where the receiver is connected to the processor;

the receiver is configured to receive first information and second information that are sent by a network device, where the first information is used to indicate that at least one default bandwidth part BWP each corresponds to at least two active BWPs, the second information is used to indicate that the at least two active BWPs correspond to at least one first timer, and the first timer is a timer used by the terminal to perform deactivation processing on at least one of the at least two active BWPs; and the processor is configured to: perform deactivation processing on the at least one of the at least two active BWPs and activation processing on a BWP in the at least one default BWP based on the first information and the second information, or perform deactivation processing on the at least one of the at least two active BWPs based on the first information and the second information.

In a possible implementation, the first information is specifically used to indicate that one default BWP corresponds to at least two active BWPs, and the second information is specifically used to indicate that the active BWPs each correspond to one first timer; and the processor is specifically configured to: perform, based on the first information and the second information, deactivation processing on an active BWP corresponding to a first timer that expires and activation processing on the default BWP corresponding to the at least two active BWPs, or perform, based on the first information and the second information, deactivation processing on an active BWP corresponding to a first timer that expires.

In a possible implementation, the first information is specifically used to indicate that at least two default BWPs each correspond to at least two active BWPs, and the second information is specifically used to indicate that the active BWPs each correspond to one first timer; and the processor is specifically configured to: for at least two active BWPs corresponding to any one of the default BWPs, perform, based on the first information and the second information, deactivation processing on an active BWP corresponding to a first timer that expires and activation processing on the default BWP corresponding to the at least two active BWPs, or perform, based on the first information and the second information, deactivation processing on an active BWP corresponding to a first timer that expires.

In a possible implementation, the processor is specifically configured to:

if the active BWP corresponding to the first timer that expires is the last active BWP, perform deactivation processing on the active BWP corresponding to the first timer that expires and activation processing on the default BWP corresponding to the at least two active BWPs; or if the active BWP corresponding to the first timer that expires is the first active BWP, perform deactivation processing on the active BWP corresponding to the first timer that expires and activation processing on the default BWP corresponding to the at least two active BWPs.

In a possible implementation, the processor is specifically configured to:

if the active BWP corresponding to the first timer that expires is not the last active BWP, perform deactivation processing on the active BWP corresponding to the first timer that expires;

if the active BWP corresponding to the first timer that expires is not the first active BWP, perform deactivation processing on the active BWP corresponding to the first timer that expires; or if the default BWP is active, perform deactivation processing on an active BWP corresponding to each first timer that expires.

In a possible implementation, the first information is specifically used to indicate that at least two default BWPs each correspond to at least two active BWPs, and the second information is specifically used to indicate that at least two active BWPs corresponding to each of the at least one default BWP correspond to one first timer; and the processor is specifically configured to: for at least two active BWPs corresponding to any one of the default BWPs, perform, based on the first information and the second information, deactivation processing on at least two active BWPs corresponding to a first timer that expires and activation processing on the default BWP.

In a possible implementation, the receiver is further configured to receive third information sent by the network device, where the third information is used to indicate that all active BWPs correspond to one second timer, and the second timer is a timer used by the terminal to perform deactivation processing on all active BWPs corresponding to a first timer that does not expire; and the processor is specifically configured to: when the second timer expires and there is a first timer that does not expire, perform, based on the first information, the second information, and the third information, deactivation processing on all active BWPs corresponding to the first timer that does not expire and activation processing on a default BWP corresponding to each of the active BWPs.

In a possible implementation, the receiver is further configured to receive fourth information sent by the network device, where the fourth information is used to indicate that at least two active BWPs corresponding to each default BWP correspond to one second timer, and the second timer is a timer used by the terminal to perform deactivation processing on an active BWP that corresponds to each default BWP and that corresponds to a first timer that does not expire; and the processor is specifically configured to: for each default BWP, when the second timer expires and there is a first timer that does not expire, perform, based on the first information, the second information, and the third information, deactivation processing on all active BWPs corresponding to the first timer that does not expire and activation processing on the default BWP.

According to a twelfth aspect, an embodiment of this application provides a terminal, including a receiver and a processor, where the receiver is connected to the processor;

the receiver is configured to receive first information sent by a network device, where the first information is used to indicate that at least two active BWPs correspond to at least one first timer; and the processor is configured to set a value of a first timer that does not expire to an initial value based on the first information.

In a possible implementation, the active BWPs each correspond to one first timer; and the processor is specifically configured to:

for any one of the active BWPs, if the terminal receives downlink control information DCI on the active BWP corresponding to a first timer that does not expire, set a value of the first timer that does not expire to an initial value based on the first information; or for any one of the active BWPs, if the terminal receives downlink control information DCI on the active BWP corresponding to a first timer that does not expire, set values of all first timers to initial values based on the first information.

In a possible implementation, the receiver is further configured to receive second information sent by the network device, where the second information is used to indicate that at least one default bandwidth part BWP each corresponds to at least two active BWPs, and the first information is specifically used to indicate that the at least two active BWPs corresponding to the default BWP correspond to at least one first timer; and the processor is specifically configured to set a value of a first timer that does not expire in the at least one first timer corresponding to the at least two active BWPs corresponding to the default BWP, to an initial value based on the first information and the second information.

In a possible implementation, the first information is specifically used to indicate that the active BWPs each correspond to one first timer; and the processor is specifically configured to:

for any one of the active BWPs, if the terminal receives downlink control information DCI on the active BWP corresponding to a first timer that does not expire, set a value of the first timer that does not expire to an initial value based on the first information and the second information; or for any one of the active BWPs, if the terminal receives downlink control information DCI on the active BWP corresponding to a first timer that does not expire, set values of all first timers corresponding to the at least two active BWPs corresponding to the default BWP, to initial values based on the first information and the second information.

In a possible implementation, the first information is specifically used to indicate that at least two active BWPs corresponding to each of the default BWP correspond to one first timer; and the processor is specifically configured to: for any one of the active BWPs, if the terminal receives downlink control information DCI on the active BWP corresponding to a first timer that does not expire, set a value of the first timer corresponding to the at least two active BWPs corresponding to the default BWP, to an initial value based on the first information and the second information.

In a possible implementation, the receiver is further configured to receive third information sent by the network device, where the third information is used to indicate that all active BWPs correspond to one second timer; and the processor is further configured to: if the terminal receives, before the second timer expires, downlink control information DCI on any one of the active BWPs corresponding to the second timer, set a value of the second timer to an initial value based on the third information.

In a possible implementation, the receiver is further configured to receive fourth information sent by the network device, where the fourth information is used to indicate that at least two active BWPs corresponding to each default BWP correspond to one second timer; and the processor is further configured to: if the terminal receives, before the second timer expires, downlink control information DCI on any one of the active BWPs corresponding to the second timer, set a value of the second timer to an initial value based on the fourth information.

According to a thirteenth aspect, an embodiment of this application provides a network device, including a transmitter and a processor, where the transmitter is connected to the processor;

the transmitter is configured to send first information and second information to a terminal, where the first information is used to indicate that at least one default bandwidth part BWP each corresponds to at least two active BWPs, the second information is used to indicate that the at least two active BWPs correspond to at least one first timer, and the first timer is a timer used by the network device to determine a BWP to be deactivated by the terminal in the at least two active BWPs; and the processor is configured to: determine, based on the first information and the second information, a BWP to be deactivated by the terminal in the at least two active BWPs and a BWP to be activated by the terminal in the at least one default BWP, or determine, based on the first information and the second information, a BWP to be deactivated by the terminal in the at least two active BWPs.

In a possible implementation, the first information is specifically used to indicate that one default BWP corresponds to at least two active BWPs, and the second information is specifically used to indicate that the active BWPs each correspond to one first timer; and the processor is specifically configured to: determine, based on the first information and the second information, that an active BWP corresponding to a first timer that expires is a to-be-deactivated BWP and the default BWP corresponding to the at least two active BWPs is a to-be-activated BWP, or determine, based on the first information and the second information, that an active BWP corresponding to a first timer that expires is a to-be-deactivated BWP.

In a possible implementation, the first information is specifically used to indicate that at least two default BWPs each correspond to at least two active BWPs, and the second information is specifically used to indicate that the active BWPs each correspond to one first timer; and the processor is specifically configured to: for at least two active BWPs corresponding to any one of the default BWPs, determine, based on the first information and the second information, that an active BWP corresponding to a first timer that expires is a to-be-deactivated BWP and the default BWP corresponding to the at least two active BWPs is a to-be-activated BWP, or determine, based on the first information and the second information, that an active BWP corresponding to a first timer that expires is a to-be-deactivated BWP.

In a possible implementation, the processor is specifically configured to:

if the active BWP corresponding to the first timer that expires is the last active BWP, determine that the active BWP corresponding to the first timer that expires is the to-be-deactivated BWP and the default BWP corresponding to the at least two active BWPs is the to-be-activated BWP; or if the active BWP corresponding to the first timer that expires is the first active BWP, determine that the active BWP corresponding to the first timer that expires is the to-be-deactivated BWP and the default BWP corresponding to the at least two active BWPs is the to-be-activated BWP.

In a possible implementation, the processor is specifically configured to:

if the active BWP corresponding to the first timer that expires is not the last active BWP, determine that the active BWP corresponding to the first timer that expires is the to-be-deactivated BWP; or if the active BWP corresponding to the first timer that expires is not the first active BWP, determine that the active BWP corresponding to the first timer that expires is the to-be-deactivated BWP; or if the default BWP is active, determine that an active BWP corresponding to each first timer that expires is a to-be-deactivated BWP.

In a possible implementation, the first information is specifically used to indicate that at least two default BWPs each correspond to at least two active BWPs, and the second information is specifically used to indicate that at least two active BWPs corresponding to each of the at least one default BWP correspond to one first timer; and the processor is specifically configured to: for at least two active BWPs corresponding to any one of the default BWPs, determine, based on the first information and the second information, that at least two active BWPs corresponding to a first timer that expires are to-be-activated BWPs and the default BWP is a to-be-activated BWP.

In a possible implementation, the transmitter is further configured to send third information to the terminal, where the third information is used to indicate that all active BWPs correspond to one second timer, and the second timer is a timer used by the network device to determine a BWP to be deactivated by the terminal in all the active BWPs; and the processor is specifically configured to: when the second timer expires and there is a first timer that does not expire, determine, based on the first information, the second information, and the third information, that all active BWPs corresponding to the first timer that does not expire are to-be-deactivated BWPs and a default BWP corresponding to each of the active BWPs is a to-be-activated BWP.

In a possible implementation, the transmitter is further configured to send fourth information to the terminal, where the fourth information is used to indicate that at least two active BWPs corresponding to each default BWP correspond to one second timer, and the second timer is a timer used by the network device to determine a BWP to be deactivated by the terminal in the at least two active BWPs corresponding to each default BWP; and the processor is specifically configured to: for each default BWP, when the second timer expires and there is a first timer that does not expire, determine, based on the first information, the second information, and the third information, that all active BWPs corresponding to the first timer that does not expire are to-be-deactivated BWPs and the default BWP is a to-be-activated BWP.

According to a fourteenth aspect, an embodiment of this application provides a network device, including a transmitter and a processor, where the transmitter is connected to the processor;

the transmitter is configured to send first information to a terminal, where the first information is used to indicate that at least two active BWPs correspond to at least one first timer; and the processor is configured to set a value of a first timer that does not expire to an initial value based on the first information.

In a possible implementation, the processor is specifically configured to:

for any one of the active BWPs, if the network device sends downlink control information DCI on the active BWP corresponding to a first timer that does not expire, set a value of the first timer that does not expire to an initial value based on the first information; or for any one of the active BWPs, if the network device sends downlink control information DCI on the active BWP corresponding to a first timer that does not expire, set values of all first timers to initial values based on the first information.

In a possible implementation, the transmitter is further configured to send second information to the terminal, where the second information is used to indicate that at least one default bandwidth part BWP each corresponds to at least two active BWPs, and the first information is specifically used to indicate that the at least two active BWPs corresponding to the default BWP correspond to at least one first timer; and the processor is specifically configured to set a value of a first timer that does not expire in the at least one first timer corresponding to the at least two active BWPs corresponding to the default BWP, to an initial value based on the first information and the second information.

In a possible implementation, the first information is specifically used to indicate that the active BWPs each correspond to one first timer; and the processor is specifically configured to: for any one of the active BWPs, if the network device sends downlink control information DCI on the active BWP corresponding to a first timer that does not expire, set a value of the first timer that does not expire to an initial value based on the first information and the second information; or for any one of the active BWPs, if the network device sends downlink control information DCI on the active BWP corresponding to a first timer that does not expire, set values of all first timers corresponding to the at least two active BWPs corresponding to the default BWP, to initial values based on the first information and the second information.

In a possible implementation, the first information is specifically used to indicate that at least two active BWPs corresponding to each of the default BWP correspond to one first timer; and the processor is specifically configured to: for any one of the active BWPs, if the network device sends downlink control information DCI on the active BWP corresponding to a first timer that does not expire, set a value of the first timer corresponding to the at least two active BWPs corresponding to the default BWP, to an initial value based on the first information and the second information.

In a possible implementation, the transmitter is further configured to send third information to the terminal, where the third information is used to indicate that all active BWPs correspond to one second timer; and the processor is further configured to: if the network device sends, before the second timer expires, downlink control information DCI on any one of the active BWPs corresponding to the second timer, set a value of the second timer to an initial value based on the third information.

In a possible implementation, the transmitter is further configured to send fourth information to the terminal, where the fourth information is used to indicate that at least two active BWPs corresponding to each default BWP correspond to one second timer; and the processor is further configured to: if the network device sends, before the second timer expires, downlink control information DCI on any one of the active BWPs corresponding to the second timer, set a value of the second timer to an initial value based on the fourth information.

According to a fifteenth aspect, an embodiment of this application provides a terminal, including a memory, a processor, and a computer program, where the computer program is stored in the memory, and the processor runs the computer program to perform the bandwidth part processing method in any one of the first aspect or the possible implementations of the first aspect, or the bandwidth part processing method in any one of the second aspect or the possible implementations of the second aspect, or the bandwidth part processing method in any one of the ninth aspect or the possible implementations of the ninth aspect.

According to a sixteenth aspect, an embodiment of this application provides a network device, including a memory, a processor, and a computer program, where the computer program is stored in the memory, and the processor runs the computer program to perform the bandwidth part processing method in any one of the third aspect or the possible implementations of the third aspect, or the bandwidth part processing method in any one of the fourth aspect or the possible implementations of the fourth aspect, or the bandwidth part processing method in any one of the tenth aspect or the possible implementations of the tenth aspect.

According to a seventeenth aspect, an embodiment of this application provides a storage medium, where the storage medium includes a computer program, and the computer program is used to implement the bandwidth part processing method in any one of the first aspect or the possible implementations of the first aspect, or the bandwidth part processing method in any one of the second aspect or the possible implementations of the second aspect, or the bandwidth part processing method in any one of the ninth aspect or the possible implementations of the ninth aspect.

According to an eighteenth aspect, an embodiment of this application provides a storage medium, where the storage medium includes a computer program, and the computer program is used to implement the bandwidth part processing method in any one of the third aspect or the possible implementations of the third aspect, or the bandwidth part processing method in any one of the fourth aspect or the possible implementations of the fourth aspect, or the bandwidth part processing method in any one of the tenth aspect or the possible implementations of the tenth aspect.

According to a nineteenth aspect, an embodiment of this application provides a chip, including a memory, a processor, and a computer program, where the computer program is stored in the memory, and the processor runs the computer program to perform the bandwidth part processing method in any one of the first aspect or the possible implementations of the first aspect, or the bandwidth part processing method in any one of the second aspect or the possible implementations of the second aspect, or the bandwidth part processing method in any one of the ninth aspect or the possible implementations of the ninth aspect.

According to a twentieth aspect, an embodiment of this application provides a chip, including a memory, a processor, and a computer program, where the computer program is stored in the memory, and the processor runs the computer program to perform the bandwidth part processing method in any one of the third aspect or the possible implementations of the third aspect, or the bandwidth part processing method in any one of the fourth aspect or the possible implementations of the fourth aspect, or the bandwidth part processing method in any one of the tenth aspect or the possible implementations of the tenth aspect.

According to the bandwidth part BWP processing method and the device that are provided in the embodiments, the terminal receives the first information and the second information that are sent by the network device, and when the first timer expires, the terminal performs, based on the second information indicating that at least two active BWPs correspond to at least one first timer, deactivation processing on the active BWPs corresponding to the first timer. In this case, a BWP deactivation processing process is provided for a case in which there are a plurality of active BWPs, and a corresponding first timer is set for each of the active BWPs. This can provide reliable transmission duration for a service transmitted on each BWP, avoids a delay caused due to early deactivation of a BWP, and avoids an increase in energy consumption caused due to late deactivation of a BWP. In addition, the terminal performs activation processing on the BWP in the at least one default BWP based on the second information indicating that at least one default bandwidth part BWP each corresponds to at least two active BWPs. In this case, a default BWP activation processing process is provided for a case in which there are a plurality of active BWPs, and a default BWP is configured for each active BWP. This ensures that a default BWP can be pertinently activated for a to-be-deactivated BWP, so that uplink and downlink data can be transmitted effectively.

DESCRIPTION OF EMBODIMENTS

Figure 1:
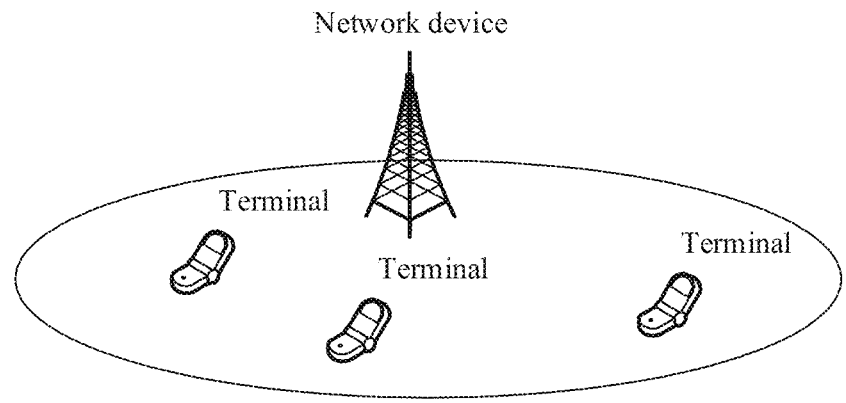
FIG. 1 is a framework diagram of a communications system according to an embodiment of this application.

FIG. 1 is a framework diagram of a communications system according to an embodiment of this application. As shown in FIG. 1, the communications system includes a network device and a terminal. The communications system may be an LTE communications system, or may be another future communications system, for example, a 5G communications system. This is not limited herein.

The network device may be a device that enables the terminal to access a wireless network. The device may be a base station or various radio access points, or may be a device that is on an access network and that communicates with the terminal over an air interface by using one or more sectors. The base station may be configured to mutually convert a received over-the-air frame and an IP packet, and serve as a router between the terminal and another part of the access network, where the another part of the access network may include an internet protocol (IP) network. The base station may further coordinate attribute management of the air interface. For example, the base station may be a base transceiver station (Base Transceiver Station, BTS) in a global system for mobile communications (Global System of Mobile communication, GSM) or code division multiple access (Code Division Multiple Access, CDMA), or may be a NodeB (NodeB, NB) in wideband code division multiple access (Wideband Code Division Multiple Access, WCDMA), or may be an evolved NodeB (Evolutional NodeB, eNB or eNodeB) in long term evolution (Long Term Evolution, LTE), a relay node or an access point, or a gNodeB gNB in a future 5G network. This is not limited herein.

The terminal may be a wireless terminal or a wired terminal. The wireless terminal may be a device that provides a user with voice and/or other service data connectivity, a handheld device with a wireless connection function, or another processing device connected to a wireless modem. The wireless terminal may communicate with one or more core networks by using a radio access network. The wireless terminal may be a mobile terminal, such as a mobile phone (or referred to as a "cellular" phone) or a computer with a mobile terminal. For example, the wireless terminal may be a portable, pocket-sized, handheld, computer built-in, or in-vehicle mobile apparatus, which exchanges voice and/or data with the radio access network, for example, a device such as a personal communications service (Personal Communication Service, PCS) phone, a cordless phone, a session initiation protocol (Session Initiation Protocol, SIP) phone set, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile console (Mobile), a remote station (Remote Station), a remote terminal (Remote Terminal), an access terminal (Access Terminal), a user terminal (User Terminal), a user agent (User Agent), user equipment (User Device or User Equipment), or a sensor having a network access function. This is not limited herein.

For an architecture of the communications system shown in FIG. 1, in 5G new radio (New Radio, NR), both a frequency division duplex (Frequency Division Duplex, FDD) system and a time division duplex (Time Division Duplex, TDD) system support a bandwidth part (Bandwidth Part, BWP).

The bandwidth part (Bandwidth Part, BWP) is a part of a system bandwidth. The system bandwidth herein may be a carrier bandwidth. The bandwidth part may also be referred to as a "carrier bandwidth part (carrier bandwidth part)", or may be referred to as an "operating bandwidth (operating bandwidth)" or a transmission bandwidth. A name and an abbreviation of the bandwidth part are not particularly limited in the embodiments of this application. The BWP is a bandwidth determined at a first level of two-level resource allocation during data transmission, and may be a segment of contiguous or non-contiguous frequency domain resources. For example, one bandwidth part includes K>0 contiguous or non-contiguous subcarriers; alternatively, one bandwidth part is a frequency domain resource including N>0 non-overlapping contiguous or non-contiguous resource blocks (Resource Block); alternatively, one bandwidth part is a frequency domain resource including M>0 non-overlapping contiguous or non-contiguous resource block groups (Resource Block Group, RBG), and one RBG includes P>0 contiguous RBs. One bandwidth part is associated with one specific system parameter (numerology) set, and the system parameter set includes at least one of a subcarrier spacing and a cyclic prefix (Cyclic Prefix, CP).

The BWP may be classified into a downlink BWP (Downlink BWP, DL BWP) and an uplink BWP (Uplink BWP, UL BWP). The network device may configure a plurality of DL BWPs and a plurality of UL BWPs for the terminal, and activate at least one DL BWP and at least one UL BWP. The terminal may receive, on an active DL BWP (that is, an active DL BWP), a downlink signal sent by the network device, where the downlink signal includes but is not limited to downlink control signaling, downlink data, and a channel state information reference signal (Channel State Information Reference Signal, CSI-RS); and the terminal may send an uplink signal on an active UL BWP, where the uplink signal includes but is not limited to uplink control signaling, uplink data, a scheduling request (Scheduling Request, SR), a sounding reference signal (Sounding Reference Signal, SRS), a channel state information (Channel State Information, CSI)/channel quality indicator (Channel Quality Indicator, CQI) feedback, and the like.

When the network device communicates with the terminal on an active DL BWP and an active UL BWP, the network device may activate another BWP (a DL BWP or a UL BWP), so that the terminal is switched (switch) to a newly activated BWP to receive or send data.

In a specific implementation process, the terminal may support a plurality of service types, and different service types may have different arrival time, latency requirements, service importance, and the like. In this case, the terminal further needs to support a plurality of active DL BWPs and a plurality of active UL BWPs. The following embodiments provide detailed embodiments of how to perform deactivation processing on a plurality of activated BWPs in a process in which the terminal supports the plurality of activated BWPs. In the following embodiments, a UL BWP and a DL BWP are not clearly distinguished, and are collectively referred to as a BWP. A person skilled in the art may understand that, when one BWP is used in the embodiments, the BWP may be a UL BWP or a DL BWP; and when two or more BWPs are used in the embodiments, the BWPs may be all UL BWPs or all DL BWPs, or some of the BWPs may be UL BWPs and some of the BWPs may be DL BWPs. The uplink or downlink BWP is not particularly limited in the embodiments.

Embodiment 1

Figure 2:
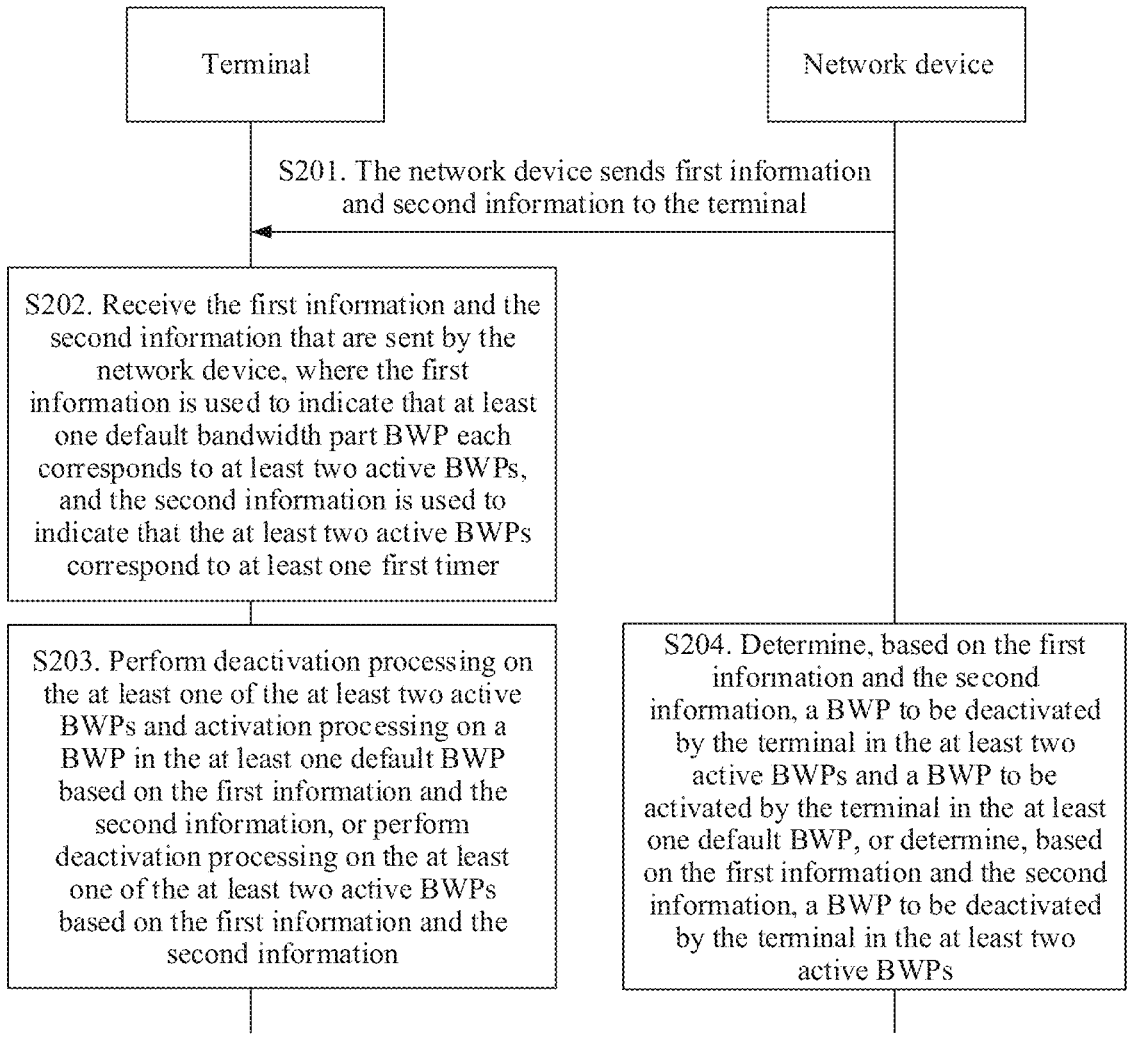
FIG. 2 is a first signaling flowchart of a BWP processing method according to an embodiment of this application.

FIG. 2 is a first signaling flowchart of a BWP processing method according to an embodiment of this application. As shown in FIG. 2, the method includes the following steps:

S201. A network device sends first information and second information to a terminal.

S202. The terminal receives the first information and the second information that are sent by the network device.

The first information is used to indicate that at least one default bandwidth part BWP each corresponds to at least two active BWPs, and the second information is used to indicate that the at least two active BWPs correspond to at least one first timer.

Specifically, the first information is used to indicate a correspondence between each of the at least one default BWP and an active BWP, and each default BWP corresponds to at least two active BWPs. In other words, the first information is used to indicate a correspondence between each default BWP and an active BWP, there is at least one default BWP, and each default BWP corresponds to at least two active BWPs. For example, when there is one default BWP, if the default BWP is a BWP 0, the first indication information is used to indicate that there is a correspondence between the BWP 0 and an active BWP 1 and an active BWP 2. When there are two default BWPs, if the default BWPs are a BWP 0 and a BWP 3, the first indication information is used to indicate that there is a correspondence between the BWP 0 and an active BWP 1 and an active BWP 2 and there is a correspondence between the BWP 3 and an active BWP 4 and an active BWP 5. Optionally, in this embodiment, the at least two active BWPs corresponding to each of the at least one default BWP are located on one carrier.

The second information is used to indicate a correspondence between a first timer and at least two active BWPs corresponding to each of the at least one default BWP. A person skilled in the art may understand that, when there is the correspondence between a first timer and at least two active BWPs, there is a correspondence between timer duration of the first timer and the at least two active BWPs. Specifically, each active BWP may correspond to one first timer, or a plurality of active BWPs may correspond to one first timer. A quantity of active BWPs corresponding to the first timer is not particularly limited in this embodiment of this application.

For the terminal, the first timer is a timer used by the terminal to perform deactivation processing on at least one of the at least two active BWPs. Specifically, the timer duration corresponding to the first timer is activation duration of a BWP. To be specific, in the timer duration, the corresponding BWP is active; and when the first timer expires, in other words, after the timer duration, the corresponding BWP needs to be deactivated. The terminal may determine, based on the timer duration of the first timer, that an active BWP needs to be deactivated. A person skilled in the art may understand that the first timer corresponding to the active BWP described in this embodiment is a first timer used to count activation duration of a BWP after the BWP is activated.

For the network device, the first timer is a timer used by the network device to determine a BWP to be deactivated by the terminal in the at least two active BWPs. The network device needs to learn which active BWP is to be deactivated by the terminal, and then does not send downlink information on the to-be-deactivated BWP. Therefore, according to a same principle, the network device may determine, based on the first timer, a BWP to be deactivated by the terminal.

In a specific implementation process, the network device may directly send the first information and the second information to the terminal, and may send the first information and the second information together or at two times. The network device may further send signaling to the terminal, for example, upper-layer signaling or higher layer signaling. The signaling may carry the first information and/or the second information. A person skilled in the art may understand that the network device may add both the first information and the second information to one piece of signaling, or may separately add the first information and the second information to two pieces of signaling.

Further, the network device may not only directly add the first information and/or the second information to signaling, but also indirectly indicate the first information and/or the second information by using signaling. For example, the network device sends, to the terminal by using one piece of signaling, a plurality of BWPs corresponding to each default BWP, and then the network device indicates, to the terminal by using another piece of signaling, a BWP that needs to be activated, to indirectly indicate the first information. A specific implementation used by the network device to send the first information and the second information to the terminal is not particularly limited in this embodiment.

In this embodiment, the first information and the second information may be described in another way. The first information is used to indicate at least two BWPs that need to be activated in a plurality of BWPs corresponding to each default BWP, and there is at least one default BWP. The second information is used to indicate that the at least two BWPs that need to be activated correspond to at least one first timer. The terminal performs activation processing on the at least two BWPs that need to be activated, to obtain the at least two active BWPs. The first timer is a timer used by the terminal to perform deactivation processing on at least one of the at least two active BWPs.

To be specific, that the first information is used to indicate that each default BWP corresponds to at least two active BWPs may be equivalent to: The first information is used to indicate at least two BWPs that need to be activated in a plurality of BWPs corresponding to each default BWP, and there is at least one default BWP. That the second information is used to indicate that the at least two active BWPs correspond to at least one first timer may be equivalent to: The second information is used to indicate that the at least two BWPs that need to be activated correspond to at least one first timer.

In the following embodiments, for indications of the first information and the second information, refer to such descriptions, and details are not described in the embodiments.

S203. The terminal performs deactivation processing on the at least one of the at least two active BWPs and activation processing on a BWP in the at least one default BWP based on the first information and the second information, or performs deactivation processing on the at least one of the at least two active BWPs based on the first information and the second information.

The second information indicates that the at least two active BWPs correspond to the at least one first timer. Therefore, when a first timer expires, the terminal may perform, based on a correspondence between a first timer and an active BWP, deactivation processing on an active BWP corresponding to the first timer.

Specifically, when a plurality of active BWPs correspond to one first timer, if the first timer expires, the terminal performs deactivation processing on the plurality of active BWPs corresponding to the first timer. When the at least two active BWPs corresponding to the default BWP correspond to one first timer, if the first timer expires, the terminal performs deactivation processing on all the at least two active BWPs corresponding to the default BWP.

Because the first information indicates that the at least one default BWP each corresponds to the at least two active BWPs, when an active BWP is deactivated, if a default BWP corresponding to the deactivated BWP is inactive, the terminal may perform activation processing on the default BWP corresponding to the deactivated BWP. When there is one default BWP, the terminal performs activation processing on the default BWP. When there are a plurality of default BWPs, if the terminal performs activation processing on a default BWP, the terminal performs activation processing on at least one of the plurality of default BWPs.

A person skilled in the art may understand that, when a default BWP corresponding to an active BWP is always active, the terminal does not need to perform activation processing on the default BWP corresponding to the active BWP when performing deactivation processing on the active BWP.

S204. The network device determines, based on the first information and the second information, a BWP to be deactivated by the terminal in the at least two active BWPs and a BWP to be activated by the terminal in the at least one default BWP, or determines, based on the first information and the second information, a BWP to be deactivated by the terminal in the at least two active BWPs.

For the network device, the network device needs to learn of the BWP to be deactivated by the terminal and the default BWP to be activated by the terminal, so that the network device does not send scheduled uplink and downlink data on the to-be-deactivated BWP, but schedules the uplink and downlink data on the to-be-activated default BWP. For the terminal, the terminal does not send or receive data on the to-be-deactivated BWP, but sends or receives data on the to-be-activated default BWP. A manner used by the network device to determine a BWP to be deactivated by the terminal and a default BWP to be activated by the terminal is similar to a determining manner of the terminal. For details, refer to the foregoing embodiment. Details are not described in this embodiment again. It should be noted that there is no strict sequence relationship between S203 and S202, and S203 and S202 may be operations performed by the network device and the terminal at the same time.

According to the BWP processing method provided in this embodiment, the terminal receives the first information and the second information that are sent by the network device, and when the first timer expires, the terminal performs, based on the second information indicating that at least two active BWPs correspond to at least one first timer, deactivation processing on the active BWPs corresponding to the first timer. In this case, a BWP deactivation processing process is provided for a case in which there are a plurality of active BWPs, and a corresponding first timer is set for each of the active BWPs. This can provide reliable transmission duration for a service transmitted on each BWP, avoids a delay caused due to early deactivation of a BWP, and avoids an increase in energy consumption caused due to late deactivation of a BWP. In addition, the terminal performs activation processing on the BWP in the at least one default BWP based on the second information indicating that at least one default bandwidth part BWP each corresponds to at least two active BWPs. In this case, a default BWP activation processing process is provided for a case in which there are a plurality of active BWPs, and a default BWP is configured for each active BWP. This ensures that a default BWP can be pertinently activated for a to-be-deactivated BWP, so that uplink and downlink data can be transmitted effectively.

The following separately describes in detail different cases in which there is one default BWP and there are a plurality of default BWPs. In the following examples, the terminal is used as an execution body for detailed description. An implementation on the network device is similar. For details, refer to an execution method on the terminal side. Details are not described in this embodiment.

First, the BWP processing method provided in this embodiment of this application is described when there is one default BWP.

Specifically, the first information is specifically used to indicate that one default BWP corresponds to at least two active BWPs, and the second information is specifically used to indicate that the active BWPs each correspond to one first timer.

The terminal performs, based on the first information and the second information, deactivation processing on an active BWP corresponding to a first timer that expires and activation processing on the default BWP corresponding to the at least two active BWPs, or performs, based on the first information and the second information, deactivation processing on an active BWP corresponding to a first timer that expires.

Correspondingly, the network device determines, based on the first information and the second information, that an active BWP corresponding to a first timer that expires is a to-be-deactivated BWP and the default BWP corresponding to the at least two active BWPs is a to-be-activated BWP, or determines, based on the first information and the second information, that an active BWP corresponding to a first timer that expires is a to-be-deactivated BWP.

Figure 3:
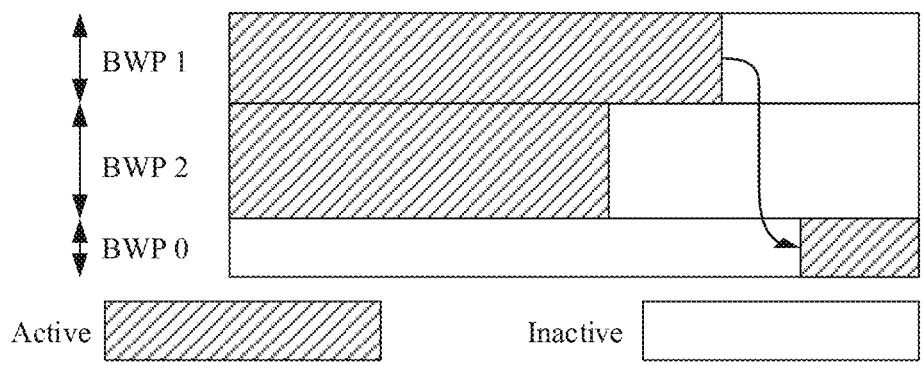
FIG. 3 is a schematic diagram of a scenario of the BWP processing method according to an embodiment of this application.

FIG. 3 is a schematic diagram of a scenario of the BWP processing method according to an embodiment of this application. As shown in FIG. 3, in this embodiment, that one default BWP corresponds to two active BWPs is used as an example for description. An example that one default BWP corresponds to more active BWPs is similar. Therefore, details are not described in this embodiment. In FIG. 2, a horizontal axis may represent a time axis, and a vertical axis may represent a bandwidth of a bandwidth part.

As shown in FIG. 3, the default BWP is a BWP 0, and the active BWPs corresponding to the default BWP are a BWP 1 and a BWP 2. In other words, the terminal operates on two BWPs: the BWP 1 and the BWP 2. The BWP 1 corresponds to one first timer, the BWP 2 corresponds to another first timer, and the first timers respectively corresponding to the BWP 1 and the BWP 2 have different timeout duration.

When the first timer corresponding to the BWP 2 expires, if the active BWP 2 corresponding to the first timer that expires is not the last active BWP, the terminal performs deactivation processing on the active BWP 2 corresponding to the first timer that expires, and performs no processing on the default BWP 0. The network device may continue to schedule service data on the BWP 1 and temporarily skip scheduling service data corresponding to the BWP 2, or continue to schedule service data on the BWP 1.

When the first timer corresponding to the BWP 1 expires, if the active BWP 1 corresponding to the first timer that expires is the last active BWP, the terminal performs deactivation processing on the active BWP 1 corresponding to the first timer that expires, and performs activation processing on the default BWP 0 corresponding to the at least two active BWPs. The network device may schedule, on the default BWP 0, service data on both the BWP 1 and the BWP 2.

In the foregoing embodiment, the last active BWP is a BWP that is in the currently active BWPs and that corresponds to a timer that is the last to expire. Specifically, on the time axis corresponding to the horizontal axis, the timer corresponding to the BWP 1 is the last to expire. Therefore, the BWP 1 is the last BWP.

Figure 4:
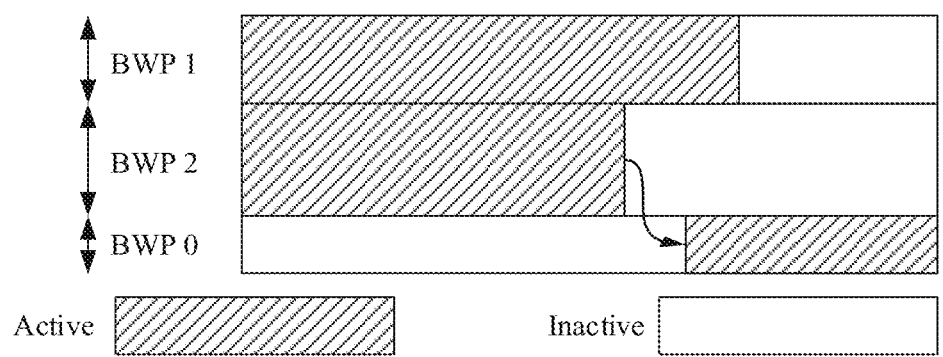
FIG. 4 is a schematic diagram of a scenario of the BWP processing method according to an embodiment of this application.

FIG. 4 is a schematic diagram of a scenario of the BWP processing method according to an embodiment of this application. As shown in FIG. 4, in this embodiment, that one default BWP corresponds to two active BWPs is used as an example for description. An example that one default BWP corresponds to more active BWPs is similar. Therefore, details are not described in this embodiment. In FIG. 4, a horizontal axis may represent a time axis, and a vertical axis may represent a bandwidth of a bandwidth part.

As shown in FIG. 4, the default BWP is a BWP 0, and the active BWPs corresponding to the default BWP are a BWP 1 and a BWP 2. In other words, the terminal operates on two BWPs: the BWP 1 and the BWP 2. The BWP 1 corresponds to one first timer, the BWP 2 corresponds to another first timer, and the first timers respectively corresponding to the BWP 1 and the BWP 2 have different timeout duration.

When the first timer corresponding to the BWP 2 expires, if the active BWP 2 corresponding to the first timer that expires is the first active BWP, the terminal performs deactivation processing on the active BWP 2 corresponding to the first timer that expires, and performs activation processing on the default BWP 0 corresponding to the at least two active BWPs. The network device may continue to schedule corresponding service data on the BWP 1, and schedule, on the default BWP 0, service data on the BWP 2.

When the first timer corresponding to the BWP 1 expires, if the active BWP 1 corresponding to the first timer that expires is not the first active BWP, the terminal performs deactivation processing on the active BWP 1 corresponding to the first timer that expires, and does not need to perform a step of activating the default BWP 0 because the BWP 0 is already active. The network device may schedule, on the BWP 0, data on both the BWP 1 and the BWP 2.

In the foregoing embodiment, the first active BWP is a BWP that is in the currently active BWPs and that corresponds to a timer that is the first to expire. Specifically, on the time axis corresponding to the horizontal axis, the timer corresponding to the BWP 2 is the first to expire. Therefore, the BWP 2 is the first BWP.

Figure 5:
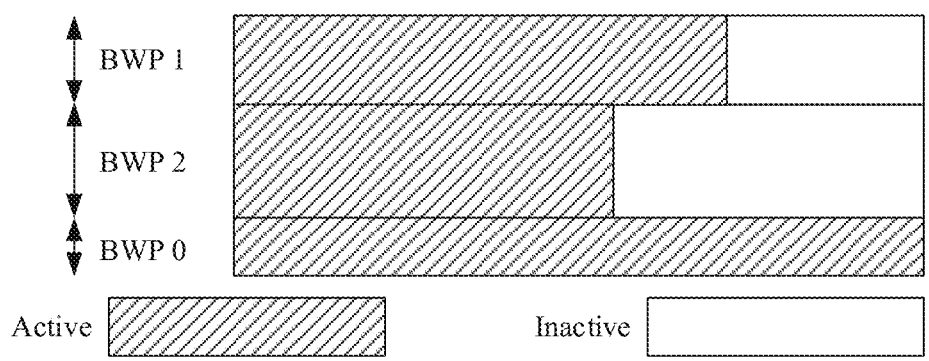
FIG. 5 is a schematic diagram of a scenario of the BWP processing method according to an embodiment of this application.

FIG. 5 is a schematic diagram of a scenario of the BWP processing method according to an embodiment of this application. As shown in FIG. 5, in this embodiment, that one default BWP corresponds to two active BWPs is used as an example for description. An example that one default BWP corresponds to more active BWPs is similar. Therefore, details are not described in this embodiment. In FIG. 5, a horizontal axis may represent a time axis, and a vertical axis may represent a bandwidth of a bandwidth part.

As shown in FIG. 5, the terminal has three active BWPs, including a default BWP 0. Activated BWPs in an active state are a BWP 1 and a BWP 2. First timers respectively corresponding to the BWP 1 and the BWP 2 have different timeout duration. When a first timer expires, the terminal performs deactivation processing on an active BWP corresponding to each first timer that expires.

When the first timer corresponding to the BWP 1 expires, the terminal performs deactivation processing on the BWP 1, and the network device schedules, on the default BWP 0, service data on the BWP 1. When the first timer corresponding to the BWP 2 expires, the terminal performs deactivation processing on the BWP 2, and the network device schedules, on the default BWP 0, service data on the BWP 2.

In the embodiments shown in FIG. 3 to FIG. 5, that the network device schedules service data means that the network device sends downlink control information DCI to the terminal, where the DCI may be used to schedule data.

The embodiments shown in FIG. 3 to FIG. 5 are compared with each other. In the embodiment shown in FIG. 3, after the BWP 2 is deactivated and before the default BWP is activated, there is a gap time in which service data on the BWP 2 cannot be scheduled. However, activation duration of the default BWP 0 is short. Therefore, energy consumption of the terminal is low.

In the embodiment shown in FIG. 4, after the BWP 2 is deactivated, the default BWP 0 is activated immediately. In this case, the network device may schedule, on the default BWP 0, the service data on the BWP 2, and the network device still schedules service data of the network device on the BWP 1. There is a time period in which both the default BWP 0 and the BWP 1 are active. In this case, although energy consumption of the terminal is slightly higher, it is considered by default that the service data on the BWP 2 can still be scheduled, thereby avoiding a delay.

In the embodiment shown in FIG. 5, the default BWP 0 is always active, and when the BWP 1 or the BWP 2 is deactivated, the service data on the BWP 1 or the BWP 2 may be scheduled on the default BWP 0. In this case, although energy consumption of the terminal is comparatively high, it is ensured that the service data on the BWP 1 or the BWP 2 can still be scheduled, thereby avoiding a delay.

Therefore, it can be learned from the foregoing descriptions that the embodiments shown in FIG. 3 to FIG. 5 have different advantages. In a specific implementation process, the embodiments shown in FIG. 3 to FIG. 5 may be selected based on different arrival time, delay requirements, importance, and the like of services. A specific selection manner is not particularly limited in this embodiment.

Then, the BWP processing method provided in this embodiment is described in detail when there are a plurality of default BWPs.

In a possible case, the first information is specifically used to indicate that at least two default BWPs each correspond to at least two active BWPs, and the second information is specifically used to indicate that the active BWPs each correspond to one first timer.

Specifically, for at least two active BWPs corresponding to any one of the default BWPs, the terminal performs, based on the first information and the second information, deactivation processing on an active BWP corresponding to a first timer that expires and activation processing on the default BWP corresponding to the at least two active BWPs, or performs, based on the first information and the second information, deactivation processing on an active BWP corresponding to a first timer that expires.

The network device determines, based on the first information and the second information, that an active BWP corresponding to a first timer that expires is a to-be-deactivated BWP and the default BWP corresponding to the at least two active BWPs is a to-be-activated BWP, or determines, based on the first information and the second information, that an active BWP corresponding to a first timer that expires is a to-be-deactivated BWP.

In this embodiment, any default BWP means that the default BWP is one of the at least one default BWP. To be specific, the foregoing operations may be performed when the default BWP is one of the at least one default BWP. For one of the at least one default BWP, a manner for deactivating at least two active BWPs corresponding to the default BWP may be any manner selected from the manners shown in FIG. 3 to FIG. 5.

For example, there are three default BWPs, and the manner shown in FIG. 3, the manner shown in FIG. 4, or the manner shown in FIG. 5 may be selected for all the three default BWPs. Alternatively, the manner shown in FIG. 3 may be selected for two of the three default BWPs, and the manner shown in FIG. 4 may be selected for the rest default BWP. Alternatively, the manner shown in FIG. 4 may be selected for two of the three default BWPs, and the manner shown in FIG. 5 may be selected for the rest default BWP. Alternatively, the manner shown in FIG. 3 may be selected for two of the three default BWPs, and the manner shown in FIG. 5 may be selected for the rest default BWP. Alternatively, different manners may be respectively selected for the default BWPs, to be specific, the manners shown in FIG. 3, FIG. 4, and FIG. 5 are respectively selected. Details of another possible manner are not described in this embodiment.

An implementation for another quantity of default BWPs is similar to an implementation for the three default BWPs. Details are not described in this embodiment again. For ease of vivid description, two default BWPs are used as an example for description in FIG. 6.

Figure 6:
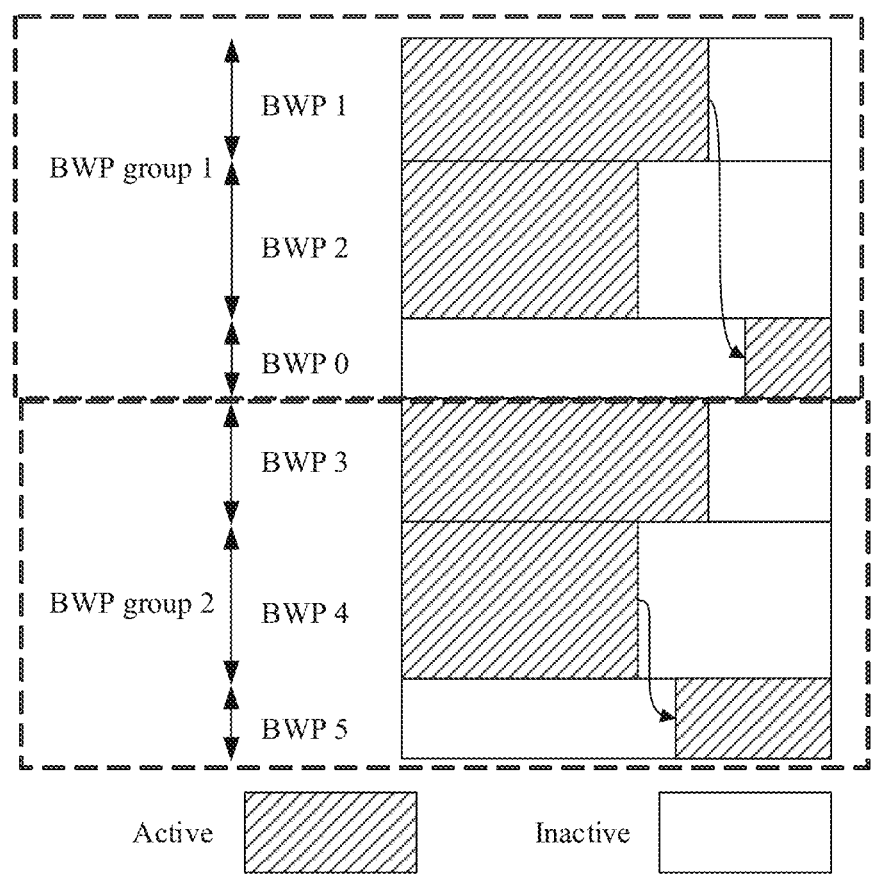
FIG. 6 is a schematic diagram of a scenario of the BWP processing method according to an embodiment of this application.

FIG. 6 is a schematic diagram of a scenario of the BWP processing method according to an embodiment of this application. As shown in FIG. 6, the terminal has two default BWPs, that is, a BWP 0 and a BWP 5, on one carrier. At an initial moment, the terminal operates on four BWPs. In other words, there are four active BWPs: a BWP 1, a BWP 2, a BWP 3, and a BWP 4. Each active BWP corresponds to one first timer, and the four first timers have different timeout duration.

The BWP 1 and the BWP 2 correspond to the default BWP 0. In this case, the BWP 0, the BWP 1, and the BWP 2 may be considered as a BWP group 1. To be specific, in this embodiment, each default BWP and at least two active BWPs corresponding to the default BWP may be used as one BWP group. Similarly, the BWP 3 and the BWP 4 correspond to the default BWP 5. In this case, the BWP 3, the BWP 4, and the BWP 5 may be considered as a BWP group 2.

According to FIG. 3, FIG. 4, and FIG. 6, an implementation for the group 1 in FIG. 6 is the implementation shown in FIG. 3, and an implementation for the group 2 in FIG. 6 is the implementation shown in FIG. 4. A person skilled in the art may understand that both the implementations for the group 1 and the group 2 may be the implementation shown in FIG. 3; or both the implementations for the group 1 and the group 2 may be the implementation shown in FIG. 4; or both the implementations for the group 1 and the group 2 may be the implementation shown in FIG. 5, or the implementation for the group 1 is the implementation shown in FIG. 3, and the implementation for the group 2 is the implementation shown in FIG. 5. Various possible implementations are not enumerated in this embodiment.

In another possible case, the first information is specifically used to indicate that at least two default BWPs each correspond to at least two active BWPs, and the second information is specifically used to indicate that at least two active BWPs corresponding to each of the at least one default BWP correspond to one first timer.

For at least two active BWPs corresponding to any one of the default BWPs, the terminal performs, based on the first information and the second information, deactivation processing on at least two active BWPs corresponding to a first timer that expires and activation processing on the default BWP. The network device determines, based on the first information and the second information, that at least two active BWPs corresponding to a first timer that expires are to-be-activated BWPs and the default BWP is a to-be-activated BWP.

In this case, each default BWP corresponds to one first timer. In other words, each BWP group corresponds to one first timer. The first timer corresponding to each group has different timeout duration. In this embodiment, two default BWPs are used as an example for detailed description. An implementation for a plurality of default BWPs is similar. Therefore, details are not described in this embodiment again.

Figure 7:
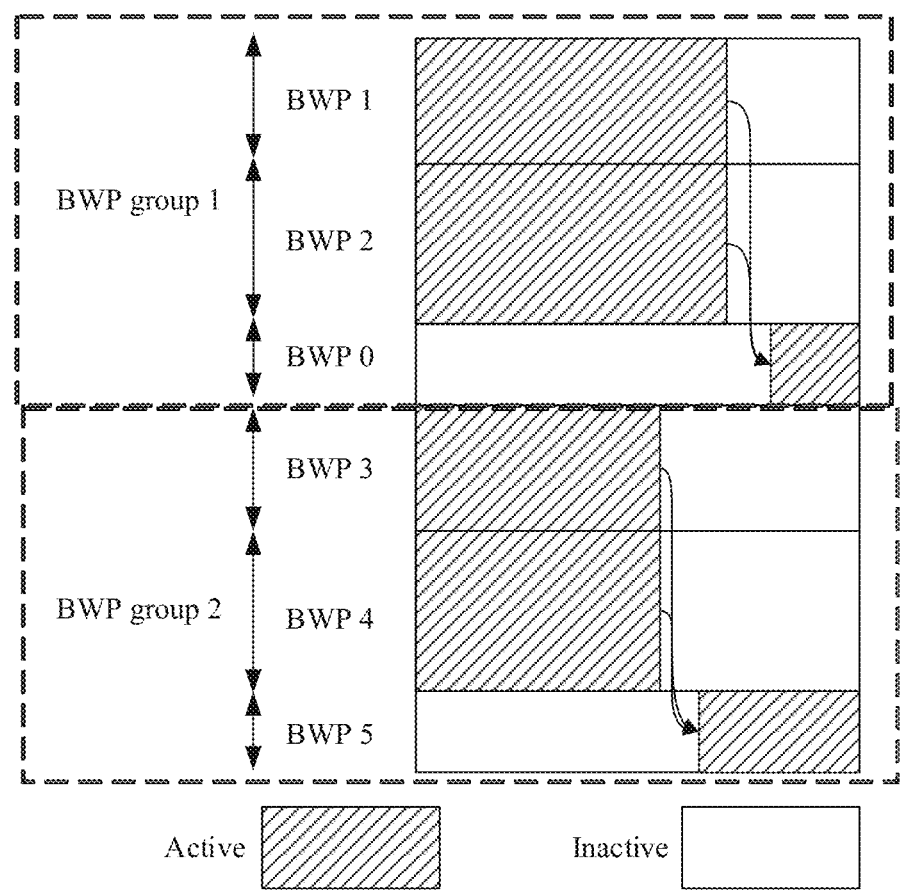
FIG. 7 is a schematic diagram of a scenario of the BWP processing method according to an embodiment of this application.

FIG. 7 is a schematic diagram of a scenario of the BWP processing method according to an embodiment of this application. As shown in FIG. 7, the terminal has two default BWPs, that is, a BWP 0 and a BWP 5, on one carrier. At an initial moment, the terminal operates on four BWPs. In other words, there are four active BWPs: a BWP 1, a BWP 2, a BWP 3, and a BWP 4. Active BWPs corresponding to each default BWP each correspond to one first timer. To be specific, there are a total of two corresponding first timers, and the two first timers have different timeout duration.

When a first timer corresponding to the BWP 1 and the BWP 2 expires, both the BWP 1 and the BWP 2 are deactivated, and the default BWP 0 is activated. When a first timer corresponding to the BWP 3 and the BWP 4 expires, both the BWP 3 and the BWP 4 are deactivated, and the default BWP 5 is activated.

In the foregoing embodiment, a process of deactivating an active BWP is provided for a case in which a plurality of default BWPs each corresponds to at least two active BWPs. In a specific implementation process, which implementation is specifically used may be selected based on an actual requirement. This is not particularly limited in this embodiment.

Based on the foregoing embodiment, the default BWPs provided in this embodiment each correspond to at least two active BWPs. Based on this, wider extension may be further performed. To be specific, there is a case in which at least one default BWP each corresponds to at least two active BWPs, or there is a case in which at least one default BWP each corresponds to one active BWP and the active BWP corresponds to one first timer. For example, the terminal operates on three default BWPs. Two of the three default BWPs each correspond to at least two active BWPs, and for a manner for deactivating at least two default BWPs corresponding to each default BWP, refer to the embodiments shown in FIG. 3 to FIG. 5; and the rest default BWP corresponds to one active BWP, and the active BWP corresponds to one first timer. When the first timer expires, the active BWP is deactivated, and the corresponding default BWP is activated.

Based on the foregoing embodiment, in this embodiment of this application, a second timer is further set on a basis of setting the first timer. In other words, not only a deactivation scenario when the first timer expires is considered, but also a deactivation scenario when the second timer expires is considered. In this embodiment of this application, all active BWPs correspond to one second timer, and the at least two active BWPs corresponding to each default BWP correspond to one second timer. The following embodiments separately provide detailed descriptions.

In a possible implementation, one second timer is configured for all active BWPs. A specific implementation process is as follows:

The terminal receives third information sent by the network device, where the third information is used to indicate that all active BWPs correspond to one second timer, and the second timer is a timer used by the terminal to perform deactivation processing on all active BWPs corresponding to a first timer that does not expire.

When the second timer expires and there is a first timer that does not expire, the terminal performs, based on the first information, the second information, and the third information, deactivation processing on all active BWPs corresponding to the first timer that does not expire and activation processing on a default BWP corresponding to each of the active BWPs.

Correspondingly, the network device sends third information to the terminal, where the third information is used to indicate that all active BWPs correspond to one second timer, and the second timer is a timer used by the network device to determine a BWP to be deactivated by the terminal in all the active BWPs.

When the second timer expires and there is a first timer that does not expire, the network device determines, based on the first information, the second information, and the third information, that all active BWPs corresponding to the first timer that does not expire are to-be-deactivated BWPs and a default BWP corresponding to each of the active BWPs is a to-be-activated BWP.

Figure 8:
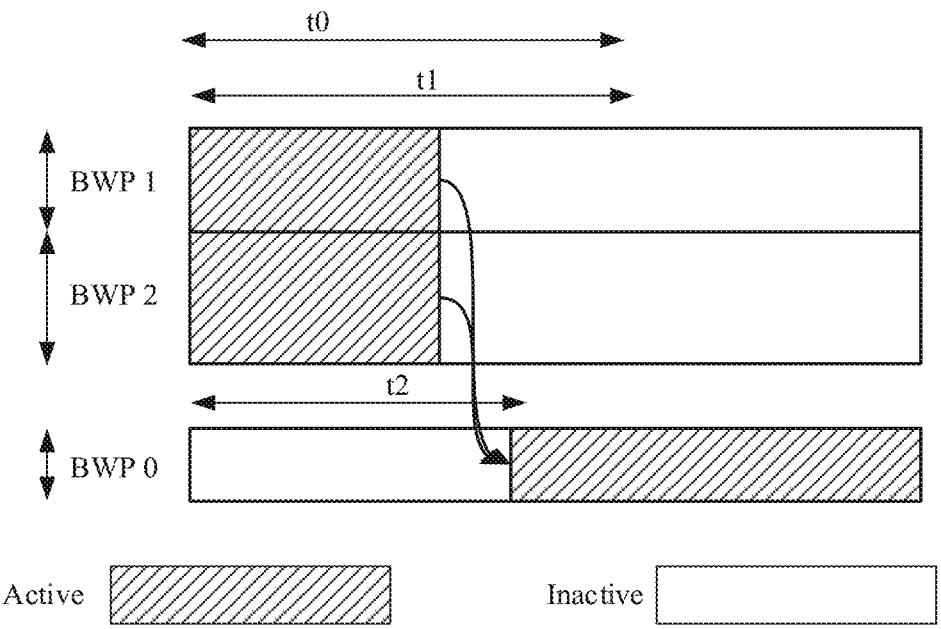
FIG. 8 is a schematic diagram of a scenario of the BWP processing method according to an embodiment of this application.

A specific example is used as an example. FIG. 8 is a schematic diagram of a scenario of the BWP processing method according to an embodiment of this application. As shown in FIG. 8, two types of timers are configured for the terminal. Two first timers correspond to timer duration t1 and timer duration t2, respectively. An active BWP 1 corresponds to t1, and an active BWP 2 corresponds to t2. A second timer corresponds to timer duration t0, and the second timer t0 corresponds to an entire carrier.

It can be learned from FIG. 8 that the timer duration of the two first timers is greater than the timer duration of the second timer. When the second timer expires, the two first timers do not expire. In this case, both the BWP 1 and the BWP 2 are deactivated, and a default BWP 0 is activated.

Figure 9:
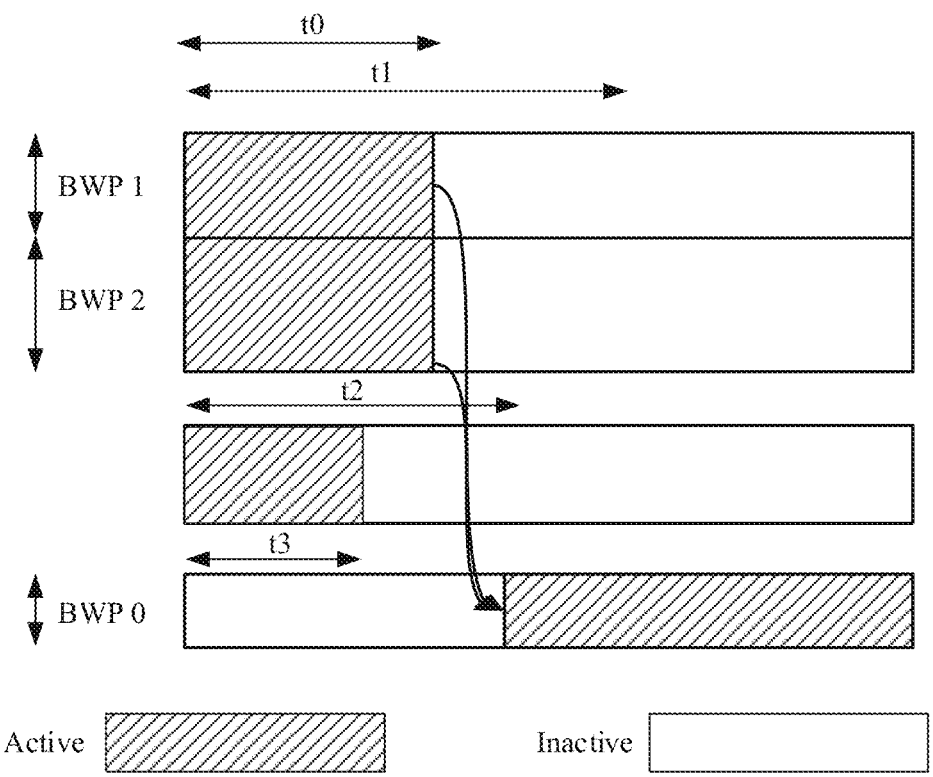
FIG. 9 is a schematic diagram of a scenario of the BWP processing method according to an embodiment of this application.

Another specific example is used as an example. FIG. 9 is a schematic diagram of a scenario of the BWP processing method according to an embodiment of this application. As shown in FIG. 9, two types of timers are configured for the terminal. Three first timers correspond to timer duration t1, timer duration t2, and timer duration t3, respectively. An active BWP 1 corresponds to t1, an active BWP 2 corresponds to t2, and an active BWP 3 corresponds to t3. A second timer corresponds to timer duration t0, and the second timer t0 corresponds to an entire carrier.

It can be learned from FIG. 9 that the timer duration t1 and t2 of the two first timers are greater than the timer duration of the second timer, and the timer duration t3 of the rest first timer is less than the timer duration of the second timer. When the first timer corresponding to t3 expires, the active BWP corresponding to t3 is deactivated. In this case, a default BWP 0 is not activated, and is still inactive. When the second timer expires, the two first timers t1 and t2 do not expire. In this case, both the BWP 1 and the BWP 2 are deactivated, and the default BWP 0 is activated.

Figure 10:
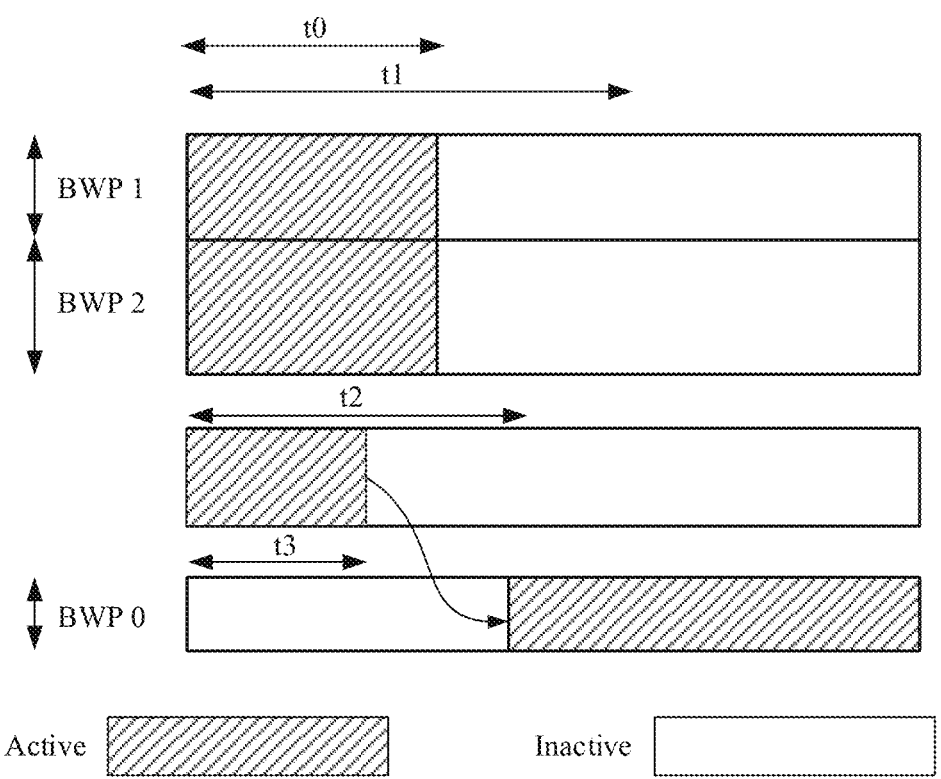
FIG. 10 is a schematic diagram of a scenario of the BWP processing method according to an embodiment of this application.

Another specific example is used as an example. FIG. 10 is a schematic diagram of a scenario of the BWP processing method according to an embodiment of this application. A difference between the embodiment shown in FIG. 10 and the embodiment shown in FIG. 9 lies in: When a first timer corresponding to t3 expires, an active BWP corresponding to t3 is deactivated. In this case, a default BWP 0 is activated. When a second timer expires, two first timers t1 and t2 do not expire. In this case, both a BWP 1 and a BWP 2 are deactivated. The default BWP 0 is already activated, and therefore the default BWP 0 needs to remain active.

A person skilled in the art may understand that if the default BWP 0 is always active, deactivation processing may be performed on an active BWP based on only the first timer and the second timer.

Further, in the embodiments shown in FIG. 8 to FIG. 10, a case in which there is one default BWP 0 is provided. An implementation is similar in a scenario in which a plurality of default BWPs 0 are included. A second timer is equivalent to a main switch. When the second timer expires and there is a first timer that does not expire, the terminal performs deactivation processing on all active BWPs. In this case, all inactive BWPs may be understood as all the active BWPs corresponding to the first timer that does not expire.

In another possible implementation, the at least two active BWPs corresponding to each default BWP correspond to one second timer. A specific implementation is as follows:

The terminal receives fourth information sent by the network device, where the fourth information is used to indicate that at least two active BWPs corresponding to each default BWP correspond to one second timer, and the second timer is a timer used by the terminal to perform deactivation processing on an active BWP that corresponds to each default BWP and that corresponds to a first timer that does not expire.

For each default BWP, when the second timer expires and there is a first timer that does not expire, the terminal performs, based on the first information, the second information, and the third information, deactivation processing on all active BWPs corresponding to the first timer that does not expire and activation processing on the default BWP.

Correspondingly, the network device sends fourth information to the terminal, where the fourth information is used to indicate that at least two active BWPs corresponding to each default BWP correspond to one second timer, and the second timer is a timer used by the network device to determine a BWP to be deactivated by the terminal in the at least two active BWPs corresponding to each default BWP.

For each default BWP, when the second timer expires and there is a first timer that does not expire, the network device determines, based on the first information, the second information, and the third information, that all active BWPs corresponding to the first timer that does not expire are to-be-deactivated BWPs and the default BWP is a to-be-activated BWP.

In this embodiment, each default BWP and at least two active BWPs corresponding to the default BWP may form one BWP group. In this case, the terminal operates on a plurality of BWP groups. For a manner used by the terminal to perform deactivation processing on each BWP group based on a first timer and a second timer, refer to the embodiments shown in FIG. 8 to FIG. 10. Details are not described in this embodiment again.

In this embodiment, the first timer and the second timer are set for completing deactivation processing on the plurality of active BWPs. This can be applied to more scenarios, meet service requirements of different services, and reduce energy losses as many as possible.

Embodiment 2

Embodiment 1 provides a method for deactivating an active BWP when the first timer and the second timer expire. The following describes in detail a method for restarting a first timer and a second timer.

Figure 11:
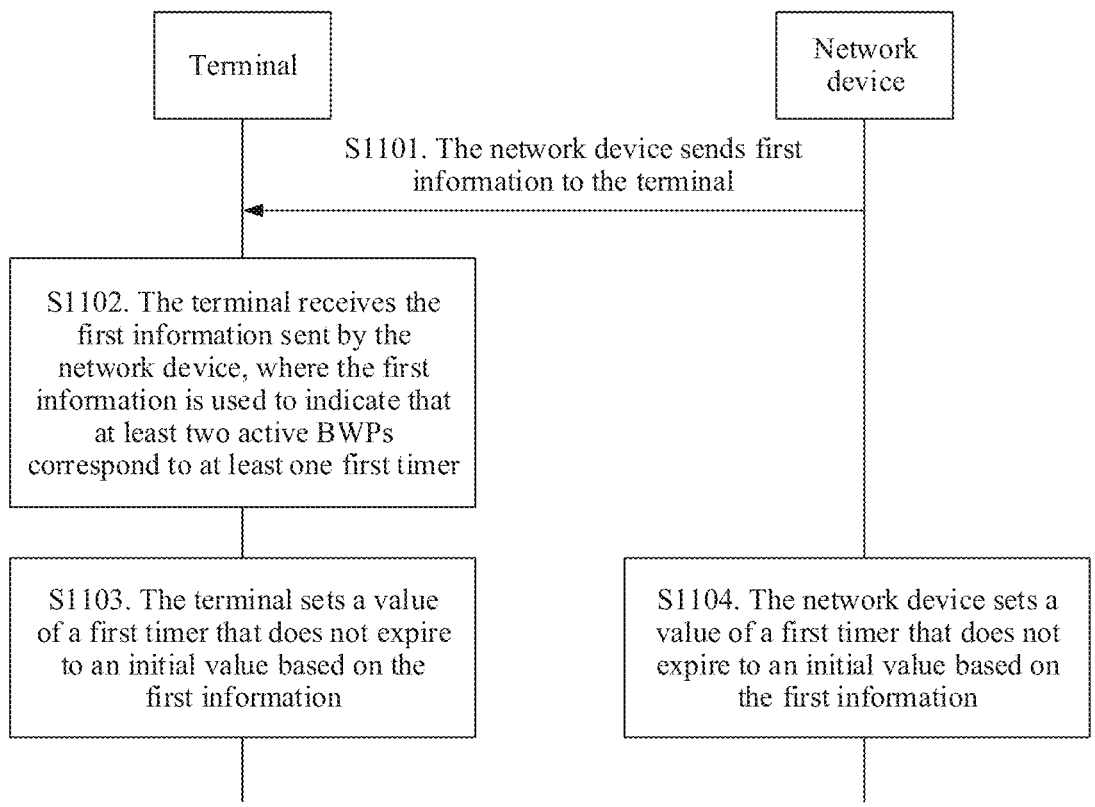
FIG. 11 is a second signaling flowchart of a BWP processing method according to an embodiment of this application.

FIG. 11 is a second signaling flowchart of a BWP processing method according to an embodiment of this application. As shown in FIG. 11, the method includes the following steps:

S1101. A network device sends first information to a terminal.

S1102. The terminal receives the first information sent by the network device, where the first information is used to indicate that at least two active BWPs correspond to at least one first timer.

S1103. The terminal sets a value of a first timer that does not expire to an initial value based on the first information.

S1104. The network device sets a value of a first timer that does not expire to an initial value based on the first information.

In a specific implementation process, the network device may directly send the first information, or may send the first information by using higher layer signaling or upper-layer signaling. The terminal may receive the first information sent by the network device. The first information may be used to indicate a correspondence between a first timer and at least two active BWPs.

When the terminal receives, on the active BWPs corresponding to the first timer, DCI sent by the network device, the terminal sets the value of the first timer that does not expire to the initial value based on the correspondence between a first timer and at least two active BWPs. In other words, the terminal restarts the first timer before the first timer expires.

There is no strict sequence relationship between S1103 and S1104, and S1103 and S1104 may be operations performed by the network device and the terminal at the same time.

A person skilled in the art may understand that the network device needs to learn of an active BWP or an activated default BWP, and these BWPs are determined based on the first timer. Therefore, the network device also needs to set the value of the first timer that does not expire to the initial value based on the first information. Specifically, when the network device sends DCI on the active BWPs corresponding to the first timer that does not expire, the network device sets the value of the first timer that does not expire to the initial value.

According to the BWP processing method provided in this embodiment of this application, the network device sends the first information to the terminal, and the terminal receives the first information sent by the network device, where the first information is used to indicate that the at least two active BWPs correspond to the at least one first timer; and the terminal and the network device set the value of the first timer that does not expire to the initial value based on the first information. A process of restarting the first timer is provided for a case in which there are a plurality of active BWPs, thereby ensuring scheduling continuity of the network device.

The following separately describes various possible implementations in detail. In the following examples, the terminal is used as an execution body for detailed description. An implementation on the network device is similar. For details, refer to an execution method on the terminal side. Details are not described in this embodiment.

First, that the active BWPs each correspond to one first timer is used as an example for detailed description.

In a possible implementation, the active BWPs each correspond to one first timer. For any one of the active BWPs, if the terminal receives downlink control information DCI on the active BWP corresponding to a first timer that does not expire, the terminal sets a value of the first timer that does not expire to an initial value based on the first information.

Correspondingly, if the network device sends downlink control information DCI on the active BWP corresponding to a first timer that does not expire, the network device sets a value of the first timer that does not expire to an initial value based on the first information.

For any one of the active BWPs, the foregoing operation can be performed when the active BWP is one of the at least one active BWP.

Figure 12:
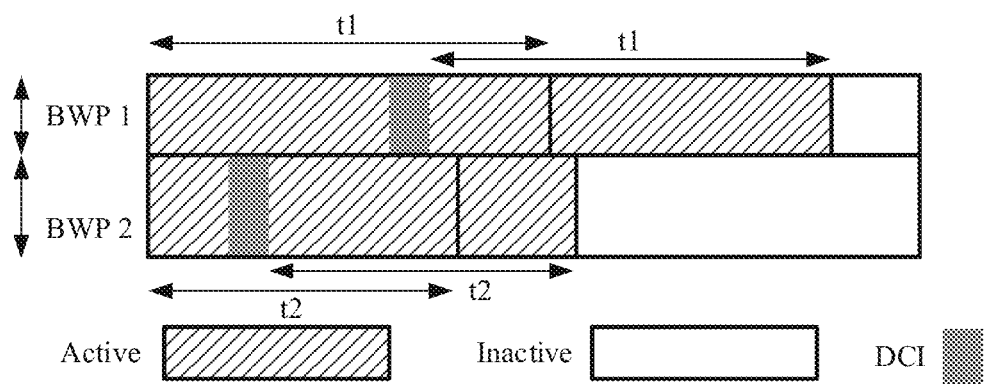
FIG. 12 is a schematic diagram of a scenario of the BWP processing method according to an embodiment of this application.

A specific example is used as an example. FIG. 12 is a schematic diagram of a scenario of the BWP processing method according to an embodiment of this application. As shown in FIG. 12, the terminal operates on a BWP 1 and a BWP 2. In other words, the terminal has two active BWPs: the BWP 1 and the BWP 2. Each BWP corresponds to one first timer, different service data is scheduled on the BWP 1 and the BWP 2, and the BWP 1 and the BWP 2 do not interfere with each other. The BWP 1 corresponds to a first timer with timer duration t1, and the BWP 2 corresponds to a first timer with timer duration t2.

As shown in FIG. 12, a gray area represents a process in which the network device sends DCI to the terminal. When the terminal successfully decodes, on the BWP 1, one piece of DCI for scheduling data, the first timer corresponding to the BWP 1 is restarted, in other words, reset to an initial value. When the terminal successfully decodes, on the BWP 2, one piece of DCI for scheduling data, the first timer corresponding to the BWP 2 is restarted, in other words, reset to an initial value.

In another possible implementation, the active BWPs each correspond to one first timer. For any one of the active BWPs, if the terminal receives downlink control information DCI on the active BWP corresponding to a first timer that does not expire, the terminal sets values of all first timers to initial values based on the first information.

Correspondingly, if the network device sends downlink control information DCI on the active BWP corresponding to a first timer that does not expire, the network device sets values of all first timers to initial values based on the first information.

Figure 13:
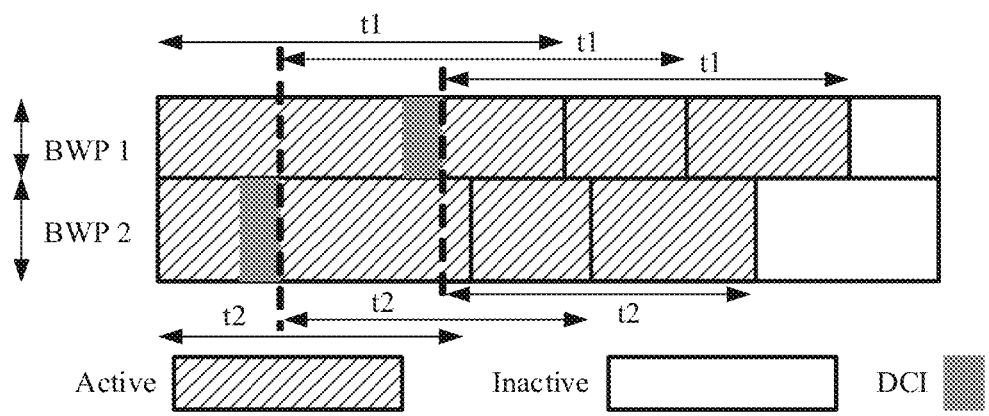
FIG. 13 is a schematic diagram of a scenario of the BWP processing method according to an embodiment of this application.

A specific example is used as an example. FIG. 13 is a schematic diagram of a scenario of the BWP processing method according to an embodiment of this application. As shown in FIG. 13, the terminal operates on a BWP 1 and a BWP 2. In other words, the terminal has two active BWPs: the BWP 1 and the BWP 2. Each BWP corresponds to one first timer, and the BWP 1 and the BWP 2 interfere with each other. In a possible scenario, a same type of service data is scheduled on the BWP 1 and the BWP 2. The BWP 1 corresponds to a first timer with timer duration t1, and the BWP 2 corresponds to a first timer with timer duration t2.

As shown in FIG. 13, a gray area represents a process in which the network device sends DCI to the terminal. When the terminal successfully decodes, on either the BWP 1 or the BWP 2, one piece of DCI for scheduling data, the first timers corresponding to the two BWPs are restarted, in other words, reset to initial values. Specifically, when the terminal successfully decodes, on the BWP 1, one piece of DCI for scheduling data, the first timers corresponding to the BWP 1 and the BWP 2 are restarted, in other words, reset to the initial values. When the terminal successfully decodes, on the BWP 2, one piece of DCI for scheduling data, the first timers corresponding to the BWP 1 and the BWP 2 are restarted, in other words, reset to the initial values.

Then, a process of how to restart a first timer when the terminal supports at least one default BWP is described in detail.

Figure 14:
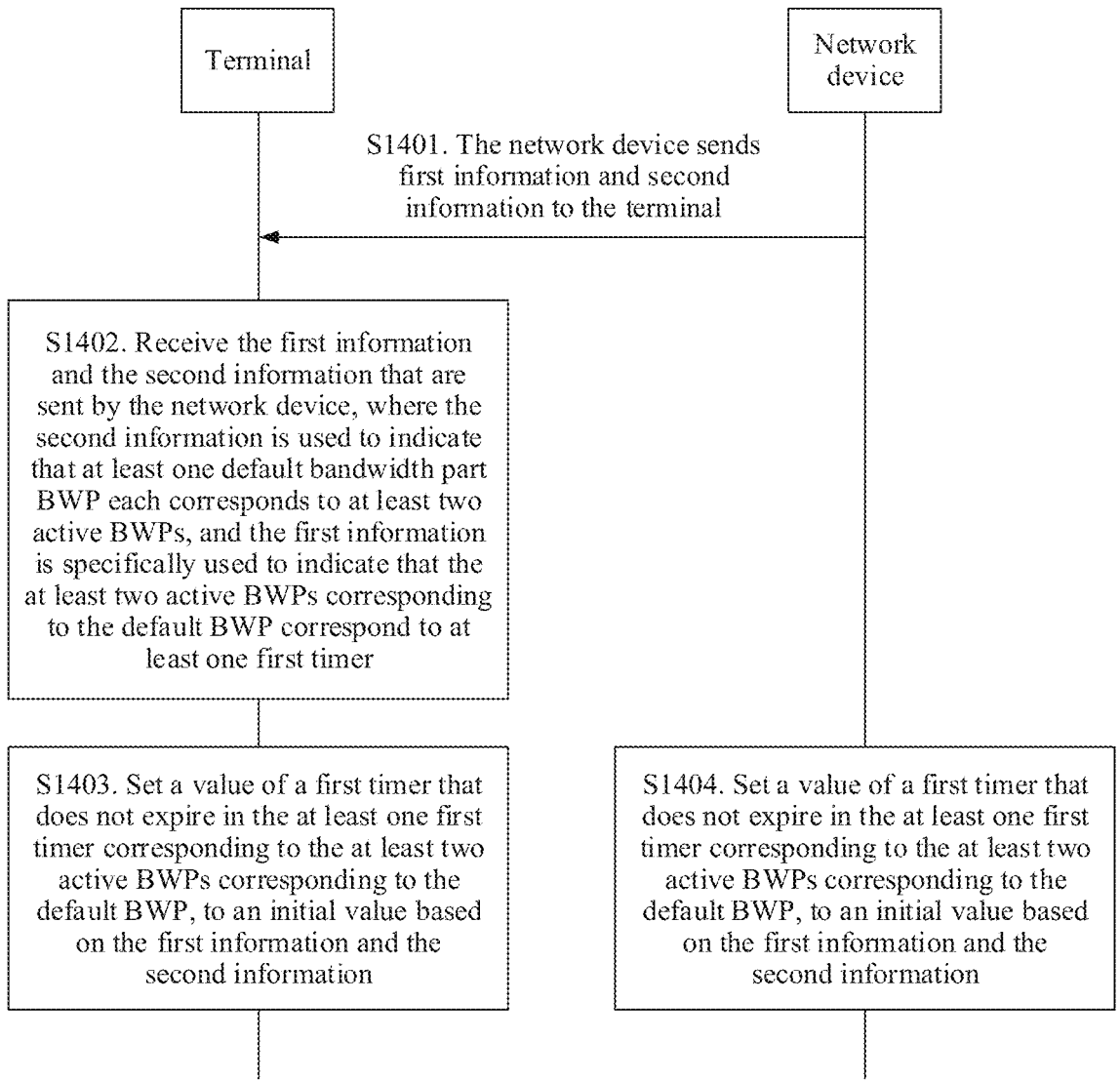
FIG. 14 is a third signaling flowchart of a BWP processing method according to an embodiment of this application.

FIG. 14 is a third signaling flowchart of a BWP processing method according to an embodiment of this application. As shown in FIG. 14, the method includes the following steps.

S1401. A network device sends first information and second information to a terminal.

S1402. The terminal receives the first information and the second information that are sent by the network device, where the second information is used to indicate that at least one default bandwidth part BWP each corresponds to at least two active BWPs, and the first information is specifically used to indicate that the at least two active BWPs corresponding to the default BWP correspond to at least one first timer.

The network device may send the first information and the second information together to the terminal, or the network device may separately send the first information and the second information to the terminal. A specific implementation used by the network device to send the first information and the second information to the terminal is not particularly limited in this embodiment. A person skilled in the art may understand that, in this embodiment shown in FIG. 14, the first information is equivalent to the second information in Embodiment 1, and the second information is equivalent to the first information in Embodiment 1.

S1403. The terminal sets a value of a first timer that does not expire in the at least one first timer corresponding to the at least two active BWPs corresponding to the default BWP, to an initial value based on the first information and the second information.

S1404. The network device sets a value of a first timer that does not expire in the at least one first timer corresponding to the at least two active BWPs corresponding to the default BWP, to an initial value based on the first information and the second information.

In a specific implementation process, different processing manners are used based on different content indicated by the first information. Descriptions are separately provided below.

In a possible implementation, the first information is specifically used to indicate that the active BWPs each correspond to one first timer. Specifically, there may be the following two cases:

In a possible case, for any one of the active BWPs, if the terminal receives downlink control information DCI on the active BWP corresponding to a first timer that does not expire, the terminal sets a value of the first timer that does not expire to an initial value based on the first information and the second information.

Correspondingly, for any one of the active BWPs, if the network device sends downlink control information DCI on the active BWP corresponding to a first timer that does not expire, the network device sets a value of the first timer that does not expire to an initial value based on the first information and the second information.

This possible case is similar to the implementation shown in FIG. 12. To be specific, the first timers are independent of each other. Provided that the terminal receives DCI on one active BWP, the terminal sets a value of a first timer that corresponds to the active BWP and that does not expire to an initial value. For a specific implementation, refer to FIG. 12. Details are not described in this embodiment again.

In another possible case, for any one of the active BWPs, if the terminal receives downlink control information DCI on the active BWP corresponding to a first timer that does not expire, the terminal sets values of all first timers corresponding to the at least two active BWPs corresponding to the default BWP, to initial values based on the first information and the second information.

For any one of the active BWPs, if the network device sends downlink control information DCI on the active BWP corresponding to a first timer that does not expire, the network device sets values of all first timers corresponding to the at least two active BWPs corresponding to the default BWP, to initial values based on the first information and the second information.

For each default BWP, at least two active BWPs corresponding to the default BWP each correspond to one first timer. Therefore, a specific implementation case for each default BWP is similar to the implementation shown in FIG. 13. To be specific, when DCI is received on one active BWP, all first timers corresponding to the default BWP are restarted. For a specific implementation, refer to FIG. 13. Details are not described in this embodiment again.

In another possible implementation, the first information is specifically used to indicate that at least two active BWPs corresponding to each of the default BWP correspond to one first timer. This possible implementation is similar to that in FIG. 7.

Specifically, for any one of the active BWPs, if the terminal receives downlink control information DCI on the active BWP corresponding to a first timer that does not expire, the terminal sets a value of the first timer corresponding to the at least two active BWPs corresponding to the default BWP, to an initial value based on the first information and the second information.

For any one of the active BWPs, if the network device sends downlink control information DCI on the active BWP corresponding to a first timer that does not expire, the network device sets a value of the first timer corresponding to the at least two active BWPs corresponding to the default BWP, to an initial value based on the first information and the second information.

Referring to FIG. 7, when DCI is received on the BWP 1 or the BWP 2, the corresponding first timer is restarted; or when the DCI is received on the BWP 3 or the BWP 4, the corresponding first timer is restarted.

According to the BWP processing method provided in this embodiment, a manner for restarting a first timer is described in detail for a scenario in which there is at least one default BWP and each default BWP corresponds to at least two active BWPs. To be specific, a process of restarting a first timer is provided in a scenario in which there are a plurality of active BWPs. This ensures continuity of scheduling data of the terminal by the network device.

Based on the foregoing embodiment, in this embodiment of this application, a second timer is further set on a basis of setting the first timer. In other words, not only a scenario in which a first timer that expires is restarted is considered, but also a scenario in which a second timer is restarted is considered. In this application, for a specific scenario in which the first timer is restarted, refer to the method shown in FIG. 14. This embodiment focuses on description of the scenario in which the second timer is restarted.

In this embodiment of this application, all active BWPs correspond to one second timer, and the at least two active BWPs corresponding to each default BWP correspond to one second timer. The following embodiments separately provide detailed descriptions.

In a possible implementation, the terminal receives third information sent by the network device, where the third information is used to indicate that all active BWPs correspond to one second timer; and if the terminal receives, before the second timer expires, downlink control information DCI on any one of the active BWPs corresponding to the second timer, the terminal sets a value of the second timer to an initial value based on the third information.

Correspondingly, the network device sends third information to the terminal, where the third information is used to indicate that all active BWPs correspond to one second timer; and if the network device sends, before the second timer expires, downlink control information DCI on any one of the active BWPs corresponding to the second timer, the network device sets a value of the second timer to an initial value based on the third information.

In a specific implementation process, because the second timer corresponds to all the active BWPs, the second timer is restarted, provided that the DCI is received on one of all the active BWPs.

In another possible implementation, the terminal receives fourth information sent by the network device, where the fourth information is used to indicate that at least two active BWPs corresponding to each default BWP correspond to one second timer; and if the terminal receives, before the second timer expires, downlink control information DCI on any one of the active BWPs corresponding to the second timer, the terminal sets a value of the second timer to an initial value based on the fourth information.

Correspondingly, the network device sends fourth information to the terminal, where the fourth information is used to indicate that at least two active BWPs corresponding to each default BWP correspond to one second timer; and if the network device sends, before the second timer expires, downlink control information DCI on any one of the active BWPs corresponding to the second timer, the network device sets a value of the second timer to an initial value based on the fourth information.

In a specific implementation process, each default BWP corresponds to one second timer. This is equivalent to: Each group of BWPs corresponds to one second timer. In the group of BWPs, when DCI is received on one of at least two active BWPs corresponding to a default BWP, the second timer corresponding to the default BWP is restarted, and a second timer corresponding to another default BWP is not restarted.

In this embodiment, a process of restarting the first timer and a process of restarting the second timer are provided. This can be applied to more scenarios, and meet service requirements of different services.

A person skilled in the art may understand that in Embodiment 1 and Embodiment 2, the terminal may not receive the first message, the second message, the third message, and the fourth message that are directly sent by the network device. The terminal may obtain the first message, the second message, the third message, and the fourth message by using another message sent by the network device or by using an internal processing process. To be specific, for some descriptions that the terminal receives the first message and the second message that are sent by the network device, it may be described as: The terminal obtains the first message and the second message, the terminal obtains the third message, and the terminal obtains the fourth message. On the network device side, it may be directly described as: The network device obtains the first message and the second message, the network device obtains the third message, and the network device obtains the fourth message.

Embodiment 3

In Embodiment 3, another method for deactivating an active BWP and activating a default BWP is provided.

Figure 15:
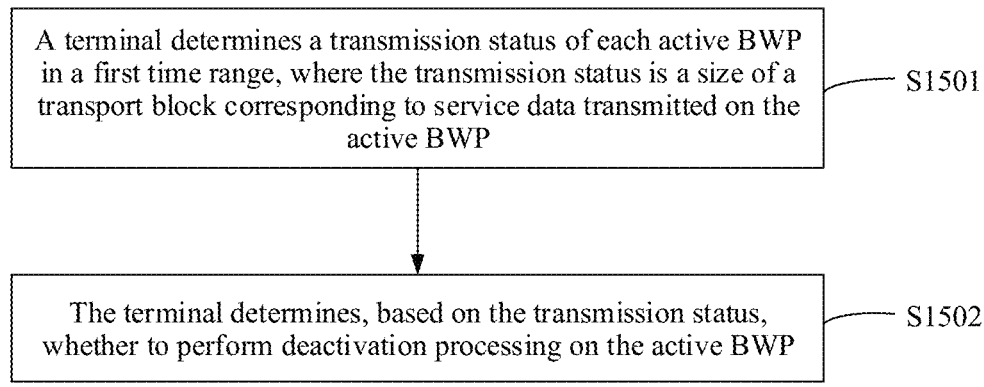
FIG. 15 is a schematic flowchart of the BWP processing method according to an embodiment of this application.
Figure 16:
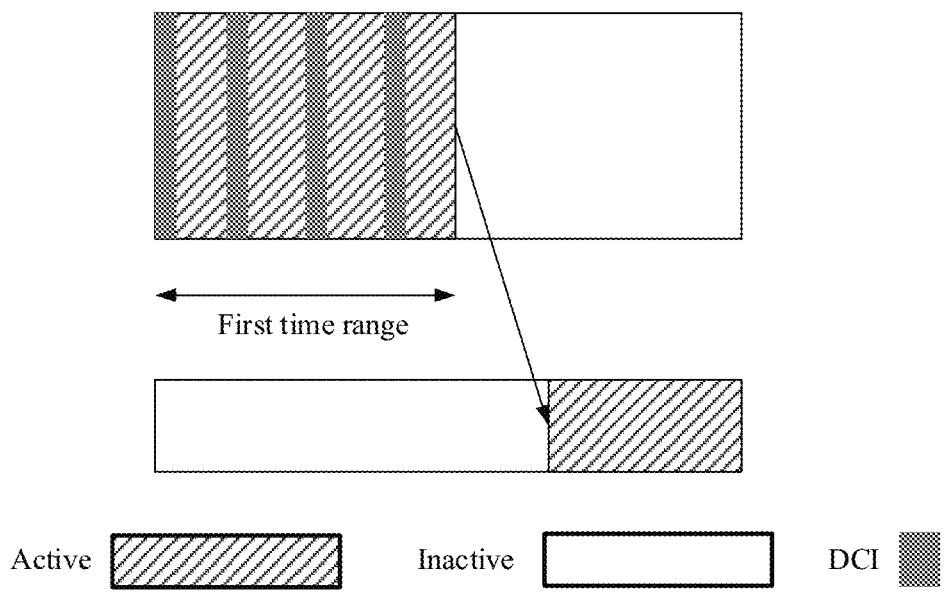
FIG. 16 is a schematic diagram of a scenario of the BWP processing method according to an embodiment of this application.

FIG. 15 is a schematic flowchart of a BWP processing method according to an embodiment of this application. FIG. 16 is a schematic diagram of a scenario of the BWP processing method according to an embodiment of this application. As shown in FIG. 15 and FIG. 16, the method includes the following steps:

S1501. A terminal determines a transmission status of each active BWP in a first time range, where the transmission status is a size of a transport block corresponding to service data transmitted on the active BWP.

S1502. The terminal determines, based on the transmission status, whether to perform deactivation processing on the active BWP.

The first time range may be an absolute time length configured by a network device, for example, 10 ms, and a timer may be used to count a time. Alternatively, the first time range may be several timeslots, for example, five timeslots, and a counter is used to calculate a quantity of timeslots.

The terminal may obtain sizes of all transport blocks in the first time range based on parameter information in DCI that is sent by the network device to schedule data. The terminal may determine, based on a size of a largest transport block or an average size of all the transport blocks, whether to perform deactivation processing.

In a specific example, the terminal obtains a transport block with a largest size in the first time range, the terminal determines whether the size of the largest transport block is less than a first threshold, and the terminal performs deactivation processing on the active BWP if the size of the largest transport block is less than the first threshold.

In another specific example, the terminal obtains an average size of a plurality of transport blocks in the first time range, the terminal determines whether the average size is less than a second threshold, and the terminal performs deactivation processing on the active BWP if the average size is less than the second threshold.

The first threshold and the second threshold may be predefined in a standard, or may be configured by the network device for the terminal.

When the terminal deactivates the active BWP, whether to simultaneously activate a default BWP corresponding to the BWP may be determined by using various solutions provided in the foregoing embodiments. For example, the terminal determines whether the active BWP is the last active BWP, or the terminal determines whether the active BWP is the first active BWP.

Likewise, the default BWP corresponding to the active BWP may correspond to a plurality of active BWPs. The first time range corresponding to the active BWP may also be the same as or different from a time range corresponding to another active BWP.

This embodiment provides the method performed on the terminal side. A person skilled in the art understands that, for a same reason as the foregoing embodiment, a method performed on the network device side is similar. For details, refer to the method performed on the terminal side. Details are not described in this embodiment again.

In this embodiment, the terminal determines the transmission status of each active BWP in the first time range, where the transmission status is the size of the transport block corresponding to the service data transmitted on the active BWP; and the terminal determines, based on the transmission status, whether to perform deactivation processing on the active BWP. Therefore, when the terminal does not fully use a bandwidth on the active BWP, data can be scheduled by activating the default BWP, so as to reduce energy consumption of the terminal.

Figure 17:
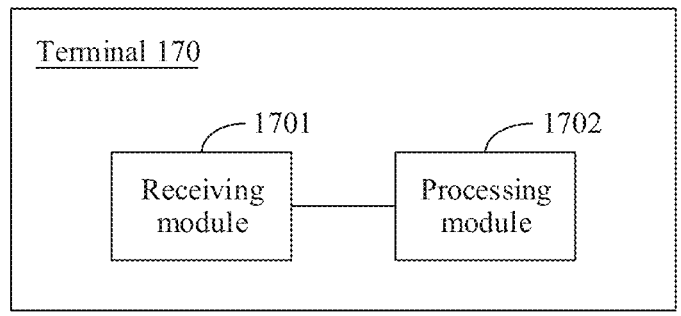
FIG. 17 is a schematic structural diagram of a terminal according to an embodiment of this application.

FIG. 17 is a schematic structural diagram of a terminal according to an embodiment of this application. As shown in FIG. 17, the terminal 170 includes a receiving module 1701 and a processing module 1702.

The receiving module 1701 is configured to receive first information and second information that are sent by a network device, where the first information is used to indicate that at least one default bandwidth part BWP each corresponds to at least two active BWPs, the second information is used to indicate that the at least two active BWPs correspond to at least one first timer, and the first timer is a timer used by the terminal to perform deactivation processing on at least one of the at least two active BWPs.

The processing module 1702 is configured to: perform deactivation processing on the at least one of the at least two active BWPs and activation processing on a BWP in the at least one default BWP based on the first information and the second information, or perform deactivation processing on the at least one of the at least two active BWPs based on the first information and the second information.

Optionally, the first information is specifically used to indicate that one default BWP corresponds to at least two active BWPs, and the second information is specifically used to indicate that the active BWPs each correspond to one first timer.

The processing module 1702 is specifically configured to: perform, based on the first information and the second information, deactivation processing on an active BWP corresponding to a first timer that expires and activation processing on the default BWP corresponding to the at least two active BWPs, or perform, based on the first information and the second information, deactivation processing on an active BWP corresponding to a first timer that expires.

Optionally, the first information is specifically used to indicate that at least two default BWPs each correspond to at least two active BWPs, and the second information is specifically used to indicate that the active BWPs each correspond to one first timer.

The processing module 1702 is specifically configured to: for at least two active BWPs corresponding to any one of the default BWPs, perform, based on the first information and the second information, deactivation processing on an active BWP corresponding to a first timer that expires and activation processing on the default BWP corresponding to the at least two active BWPs, or perform, based on the first information and the second information, deactivation processing on an active BWP corresponding to a first timer that expires.

Optionally, the processing module 1702 is specifically configured to:

if the active BWP corresponding to the first timer that expires is the last active BWP, perform deactivation processing on the active BWP corresponding to the first timer that expires and activation processing on the default BWP corresponding to the at least two active BWPs; or if the active BWP corresponding to the first timer that expires is the first active BWP, perform deactivation processing on the active BWP corresponding to the first timer that expires and activation processing on the default BWP corresponding to the at least two active BWPs.

Optionally, the processing module 1702 is specifically configured to:

if the active BWP corresponding to the first timer that expires is not the last active BWP, perform deactivation processing on the active BWP corresponding to the first timer that expires;

if the active BWP corresponding to the first timer that expires is not the first active BWP, perform deactivation processing on the active BWP corresponding to the first timer that expires; or if the default BWP is active, perform deactivation processing on an active BWP corresponding to each first timer that expires.

Optionally, the first information is specifically used to indicate that at least two default BWPs each correspond to at least two active BWPs, and the second information is specifically used to indicate that at least two active BWPs corresponding to each of the at least one default BWP correspond to one first timer.

The processing module 1702 is specifically configured to: for at least two active BWPs corresponding to any one of the default BWPs, perform, based on the first information and the second information, deactivation processing on at least two active BWPs corresponding to a first timer that expires and activation processing on the default BWP.

Optionally, the receiving module 1701 is further configured to receive third information sent by the network device, where the third information is used to indicate that all active BWPs correspond to one second timer, and the second timer is a timer used by the terminal to perform deactivation processing on all active BWPs corresponding to a first timer that does not expire.

The processing module 1702 is specifically configured to: when the second timer expires and there is a first timer that does not expire, perform, based on the first information, the second information, and the third information, deactivation processing on all active BWPs corresponding to the first timer that does not expire and activation processing on a default BWP corresponding to each of the active BWPs.

Optionally, the receiving module 1701 is further configured to receive fourth information sent by the network device, where the fourth information is used to indicate that at least two active BWPs corresponding to each default BWP correspond to one second timer, and the second timer is a timer used by the terminal to perform deactivation processing on an active BWP that corresponds to each default BWP and that corresponds to a first timer that does not expire.

The processing module 1702 is specifically configured to: for each default BWP, when the second timer expires and there is a first timer that does not expire, perform, based on the first information, the second information, and the third information, deactivation processing on all active BWPs corresponding to the first timer that does not expire and activation processing on the default BWP.

The terminal provided in this embodiment may be configured to perform the method performed by the terminal in Embodiment 1, and an implementation principle and a technical effect thereof are similar. Therefore, details are not described in this embodiment again.

Figure 18:
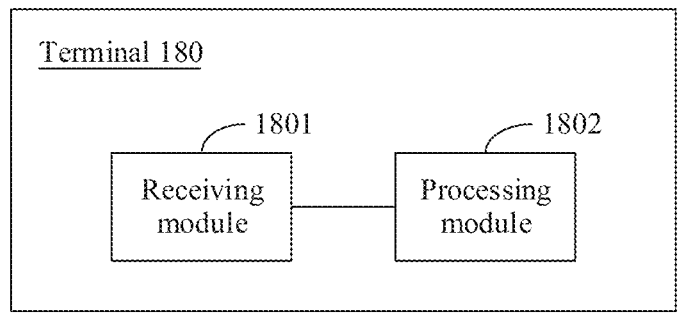
FIG. 18 is a schematic structural diagram of a terminal according to an embodiment of this application.

FIG. 18 is a schematic structural diagram of a terminal according to an embodiment of this application. As shown in FIG. 18, the terminal 180 includes a receiving module 1801 and a processing module 1802.

The receiving module 1801 is configured to receive first information sent by a network device, where the first information is used to indicate that at least two active BWPs correspond to at least one first timer.

The processing module 1802 is configured to set a value of a first timer that does not expire to an initial value based on the first information.

Optionally, the active BWPs each correspond to one first timer; and the processing module 1902 is specifically configured to:

for any one of the active BWPs, if the terminal receives downlink control information DCI on the active BWP corresponding to a first timer that does not expire, set a value of the first timer that does not expire to an initial value based on the first information; or for any one of the active BWPs, if the terminal receives downlink control information DCI on the active BWP corresponding to a first timer that does not expire, set values of all first timers to initial values based on the first information.

Optionally, the receiving module is further configured to receive second information sent by the network device, where the second information is used to indicate that at least one default bandwidth part BWP each corresponds to at least two active BWPs, and the first information is specifically used to indicate that the at least two active BWPs corresponding to the default BWP correspond to at least one first timer.

The processing module 1802 is specifically configured to set a value of a first timer that does not expire in the at least one first timer corresponding to the at least two active BWPs corresponding to the default BWP, to an initial value based on the first information and the second information.

Optionally, the first information is specifically used to indicate that the active BWPs each correspond to one first timer; and the processing module 1802 is specifically configured to:

for any one of the active BWPs, if the terminal receives downlink control information DCI on the active BWP corresponding to a first timer that does not expire, set a value of the first timer that does not expire to an initial value based on the first information and the second information; or for any one of the active BWPs, if the terminal receives downlink control information DCI on the active BWP corresponding to a first timer that does not expire, set values of all first timers corresponding to the at least two active BWPs corresponding to the default BWP, to initial values based on the first information and the second information.

Optionally, the first information is specifically used to indicate that at least two active BWPs corresponding to each of the default BWP correspond to one first timer.

The processing module 1802 is specifically configured to: for any one of the active BWPs, if the terminal receives downlink control information DCI on the active BWP corresponding to a first timer that does not expire, set a value of the first timer corresponding to the at least two active BWPs corresponding to the default BWP, to an initial value based on the first information and the second information.

Optionally, the receiving module is further configured to receive third information sent by the network device, where the third information is used to indicate that all active BWPs correspond to one second timer.

The processing module 1802 is further configured to: if the terminal receives, before the second timer expires, downlink control information DCI on any one of the active BWPs corresponding to the second timer, set a value of the second timer to an initial value based on the third information.

Optionally, the receiving module is further configured to receive fourth information sent by the network device, where the fourth information is used to indicate that at least two active BWPs corresponding to each default BWP correspond to one second timer.

The processing module 1802 is further configured to: if the terminal receives, before the second timer expires, downlink control information DCI on any one of the active BWPs corresponding to the second timer, set a value of the second timer to an initial value based on the fourth information.

The terminal provided in this embodiment may be configured to perform the method performed by the terminal in Embodiment 2, and an implementation principle and a technical effect thereof are similar. Therefore, details are not described in this embodiment again.

Figure 19:
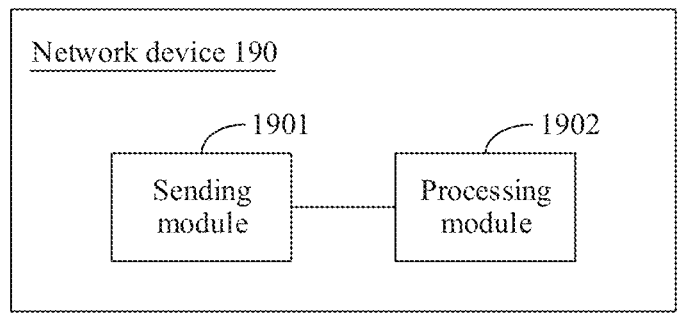
FIG. 19 is a schematic structural diagram of a network device according to an embodiment of this application.

FIG. 19 is a schematic structural diagram of a network device according to an embodiment of this application. As shown in FIG. 19, the network device includes a sending module 1901 and a processing module 1902.

The sending module 1901 is configured to send first information and second information to a terminal, where the first information is used to indicate that at least one default bandwidth part BWP each corresponds to at least two active BWPs, the second information is used to indicate that the at least two active BWPs correspond to at least one first timer, and the first timer is a timer used by the network device to determine a BWP to be deactivated by the terminal in the at least two active BWPs.

The processing module 1902 is configured to: determine, based on the first information and the second information, a BWP to be deactivated by the terminal in the at least two active BWPs and a BWP to be activated by the terminal in the at least one default BWP, or determine, based on the first information and the second information, a BWP to be deactivated by the terminal in the at least two active BWPs.

Optionally, the first information is specifically used to indicate that one default BWP corresponds to at least two active BWPs, and the second information is specifically used to indicate that the active BWPs each correspond to one first timer.

The processing module 1902 is specifically configured to: determine, based on the first information and the second information, that an active BWP corresponding to a first timer that expires is a to-be-deactivated BWP and the default timer BWP corresponding to the at least two active BWPs is a to-be-activated BWP, or determine, based on the first information and the second information, that an active BWP corresponding to a first timer that expires is a to-be-deactivated BWP.

Optionally, the first information is specifically used to indicate that at least two default BWPs each correspond to at least two active BWPs, and the second information is specifically used to indicate that the active BWPs each correspond to one first timer.

The processing module 1902 is specifically configured to: for at least two active BWPs corresponding to any one of the default BWPs, determine, based on the first information and the second information, that an active BWP corresponding to a first timer that expires is a to-be-deactivated BWP and the default BWP corresponding to the at least two active BWPs is a to-be-activated BWP, or determine, based on the first information and the second information, that an active BWP corresponding to a first timer that expires is a to-be-deactivated BWP.

Optionally, the processing module 1902 is specifically configured to:

if the active BWP corresponding to the first timer that expires is the last active BWP, determine that the active BWP corresponding to the first timer that expires is the to-be-deactivated BWP and the default BWP corresponding to the at least two active BWPs is the to-be-activated BWP; or if the active BWP corresponding to the first timer that expires is the first active BWP, determine that the active BWP corresponding to the first timer that expires is the to-be-deactivated BWP and the default BWP corresponding to the at least two active BWPs is the to-be-activated BWP.

Optionally, the processing module 1902 is specifically configured to:

if the active BWP corresponding to the first timer that expires is not the last active BWP, determine that the active BWP corresponding to the first timer that expires is the to-be-deactivated BWP;

if the active BWP corresponding to the first timer that expires is not the first active BWP, determine that the active BWP corresponding to the first timer that expires is the to-be-deactivated BWP; or if the default BWP is active, determine that an active BWP corresponding to each first timer that expires is a to-be-deactivated BWP.

Optionally, the first information is specifically used to indicate that at least two default BWPs each correspond to at least two active BWPs, and the second information is specifically used to indicate that at least two active BWPs corresponding to each of the at least one default BWP correspond to one first timer.

The processing module 1902 is specifically configured to: for at least two active BWPs corresponding to any one of the default BWPs, determine, based on the first information and the second information, that at least two active BWPs corresponding to a first timer that expires are to-be-activated BWPs and the default BWP is a to-be-activated BWP.

Optionally, the sending module 1901 is further configured to send third information to the terminal, where the third information is used to indicate that all active BWPs correspond to one second timer, and the second timer is a timer used by the network device to determine a BWP to be deactivated by the terminal in all the active BWPs.

The processing module 1902 is specifically configured to: when the second timer expires and there is a first timer that does not expire, determine, based on the first information, the second information, and the third information, that all active BWPs corresponding to the first timer that does not expire are to-be-deactivated BWPs and a default BWP corresponding to each of the active BWPs is a to-be-activated BWP.

Optionally, the sending module 1901 is further configured to send fourth information to the terminal, where the fourth information is used to indicate that at least two active BWPs corresponding to each default BWP correspond to one second timer, and the second timer is a timer used by the network device to determine a BWP to be deactivated by the terminal in the at least two active BWPs corresponding to each default BWP.

The processing module 1902 is specifically configured to: for each default BWP, when the second timer expires and there is a first timer that does not expire, determine, based on the first information, the second information, and the third information, that all active BWPs corresponding to the first timer that does not expire are to-be-deactivated BWPs and the default BWP is a to-be-activated BWP.

The network device provided in this embodiment may be configured to perform the method performed by the network device in Embodiment 1, and an implementation principle and a technical effect thereof are similar. Therefore, details are not described in this embodiment again.

Figure 20:
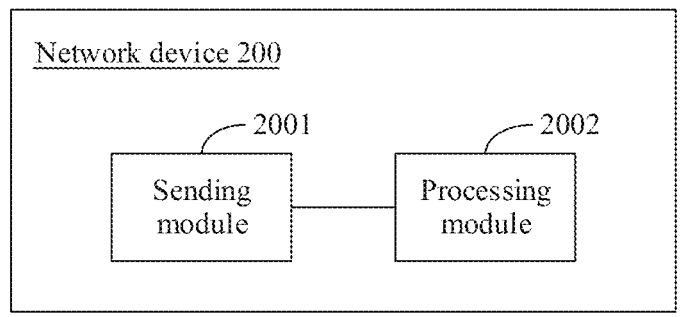
FIG. 20 is a schematic structural diagram of a network device according to an embodiment of this application.

FIG. 20 is a schematic structural diagram of a network device according to an embodiment of this application. As shown in FIG. 20, the network device 200 includes a sending module 2001 and a processing module 2002.

The sending module 2001 is configured to send first information to a terminal, where the first information is used to indicate that at least two active BWPs correspond to at least one first timer.

The processing module 2002 is configured to set a value of a first timer that does not expire to an initial value based on the first information.

Optionally, the processing module 2002 is specifically configured to:

for any one of the active BWPs, if the network device sends downlink control information DCI on the active BWP corresponding to a first timer that does not expire, set a value of the first timer that does not expire to an initial value based on the first information; or for any one of the active BWPs, if the network device sends downlink control information DCI on the active BWP corresponding to a first timer that does not expire, set values of all first timers to initial values based on the first information.

Optionally, the sending module 2001 is further configured to send second information to the terminal, where the second information is used to indicate that at least one default bandwidth part BWP each corresponds to at least two active BWPs, and the first information is specifically used to indicate that the at least two active BWPs corresponding to the default BWP correspond to at least one first timer.

The processing module 2002 is specifically configured to set a value of a first timer that does not expire in the at least one first timer corresponding to the at least two active BWPs corresponding to the default BWP, to an initial value based on the first information and the second information.

Optionally, the first information is specifically used to indicate that the active BWPs each correspond to one first timer.

The processing module 2002 is specifically configured to: for any one of the active BWPs, if the network device sends downlink control information DCI on the active BWP corresponding to a first timer that does not expire, set a value of the first timer that does not expire to an initial value based on the first information and the second information; or for any one of the active BWPs, if the network device sends downlink control information DCI on the active BWP corresponding to a first timer that does not expire, set values of all first timers corresponding to the at least two active BWPs corresponding to the default BWP, to initial values based on the first information and the second information.

Optionally, the first information is specifically used to indicate that at least two active BWPs corresponding to each of the default BWP correspond to one first timer.

The processing module 2002 is specifically configured to: for any one of the active BWPs, if the network device sends downlink control information DCI on the active BWP corresponding to a first timer that does not expire, set a value of the first timer corresponding to the at least two active BWPs corresponding to the default BWP, to an initial value based on the first information and the second information.

Optionally, the sending module 2001 is further configured to send third information to a terminal, where the third information is used to indicate that all active BWPs correspond to one second timer.

The processing module 2002 is further configured to: if the network device sends, before the second timer expires, downlink control information DCI on any one of the active BWPs corresponding to the second timer, set a value of the second timer to an initial value based on the third information.

Optionally, the sending module 2001 is further configured to send fourth information to the terminal, where the fourth information is used to indicate that at least two active BWPs corresponding to each default BWP correspond to one second timer.

The processing module 2002 is further configured to: if the network device sends, before the second timer expires, downlink control information DCI on any one of the active BWPs corresponding to the second timer, set a value of the second timer to an initial value based on the fourth information.

The network device provided in this embodiment may be configured to perform the method performed by the network device in Embodiment 2, and an implementation principle and a technical effect thereof are similar. Therefore, details are not described in this embodiment again.

It should be understood that the processing modules in FIG. 17 and FIG. 19 may be implemented as processors, or may be integrated into the processors for implementation. The receiving modules shown in FIG. 17 and FIG. 19 may be implemented as receivers, or may be integrated into receivers for implementation.

Figure 21:
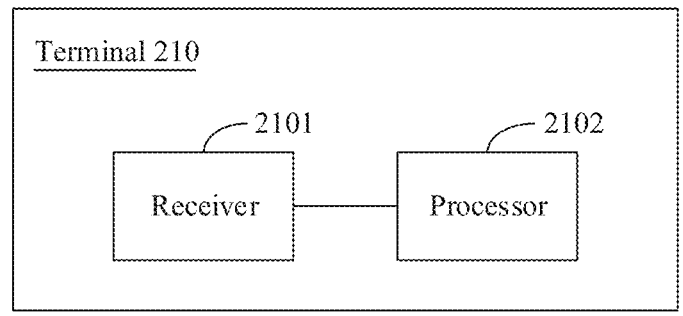
FIG. 21 is a schematic diagram of a hardware structure of a terminal according to an embodiment of this application.

FIG. 21 is a schematic diagram of a hardware structure of a terminal according to an embodiment of this application. As shown in FIG. 21, the terminal 210 includes a receiver 2101 and a processor 2102. The receiver 2101 and the processor 2102 may be directly connected, or may be connected by using a transmission bus or in another manner.

The receiver 2101 is configured to receive first information and second information that are sent by a network device, where the first information is used to indicate that at least one default bandwidth part BWP each corresponds to at least two active BWPs, the second information is used to indicate that the at least two active BWPs correspond to at least one first timer, and the first timer is a timer used by the terminal to perform deactivation processing on at least one of the at least two active BWPs.

The processor 2102 is configured to: perform deactivation processing on the at least one of the at least two active BWPs and activation processing on a BWP in the at least one default BWP based on the first information and the second information, or perform deactivation processing on the at least one of the at least two active BWPs based on the first information and the second information.

Optionally, the first information is specifically used to indicate that one default BWP corresponds to at least two active BWPs, and the second information is specifically used to indicate that the active BWPs each correspond to one first timer.

The processor 2102 is specifically configured to: perform, based on the first information and the second information, deactivation processing on an active BWP corresponding to a first timer that expires and activation processing on the default BWP corresponding to the at least two active BWPs, or perform, based on the first information and the second information, deactivation processing on an active BWP corresponding to a first timer that expires.

Optionally, the first information is specifically used to indicate that at least two default BWPs each correspond to at least two active BWPs, and the second information is specifically used to indicate that the active BWPs each correspond to one first timer.

The processor 2102 is specifically configured to: for at least two active BWPs corresponding to any one of the default BWPs, perform, based on the first information and the second information, deactivation processing on an active BWP corresponding to a first timer that expires and activation processing on the default BWP corresponding to the at least two active BWPs, or perform, based on the first information and the second information, deactivation processing on an active BWP corresponding to a first timer that expires.

Optionally, the processor 2102 is specifically configured to:

if the active BWP corresponding to the first timer that expires is the last active BWP, perform deactivation processing on the active BWP corresponding to the first timer that expires and activation processing on the default BWP corresponding to the at least two active BWPs; or if the active BWP corresponding to the first timer that expires is the first active BWP, perform deactivation processing on the active BWP corresponding to the first timer that expires and activation processing on the default BWP corresponding to the at least two active BWPs.

Optionally, the processor 2102 is specifically configured to:

if the active BWP corresponding to the first timer that expires is not the last active BWP, perform deactivation processing on the active BWP corresponding to the first timer that expires;

if the active BWP corresponding to the first timer that expires is not the first active BWP, perform deactivation processing on the active BWP corresponding to the first timer that expires; or if the default BWP is active, perform deactivation processing on an active BWP corresponding to each first timer that expires.

Optionally, the first information is specifically used to indicate that at least two default BWPs each correspond to at least two active BWPs, and the second information is specifically used to indicate that at least two active BWPs corresponding to each of the at least one default BWP correspond to one first timer.

The processor 2102 is specifically configured to: for at least two active BWPs corresponding to any one of the default BWPs, perform, based on the first information and the second information, deactivation processing on at least two active BWPs corresponding to a first timer that expires and activation processing on the default BWP.

Optionally, the receiver 2101 is further configured to receive third information sent by the network device, where the third information is used to indicate that all active BWPs correspond to one second timer, and the second timer is a timer used by the terminal to perform deactivation processing on all active BWPs corresponding to a first timer that does not expire.

The processor 2102 is specifically configured to: when the second timer expires and there is a first timer that does not expire, perform, based on the first information, the second information, and the third information, deactivation processing on all active BWPs corresponding to the first timer that does not expire and activation processing on a default BWP corresponding to each of the active BWPs.

Optionally, the receiver 2101 is further configured to receive fourth information sent by the network device, where the fourth information is used to indicate that at least two active BWPs corresponding to each default BWP correspond to one second timer, and the second timer is a timer used by the terminal to perform deactivation processing on an active BWP that corresponds to each default BWP and that corresponds to a first timer that does not expire.

The processor 2102 is specifically configured to: for each default BWP, when the second timer expires and there is a first timer that does not expire, perform, based on the first information, the second information, and the third information, deactivation processing on all active BWPs corresponding to the first timer that does not expire and activation processing on the default BWP.

The terminal provided in this embodiment may be configured to perform the method performed by the terminal in Embodiment 1, and an implementation principle and a technical effect thereof are similar. Therefore, details are not described in this embodiment again.

Figure 22:
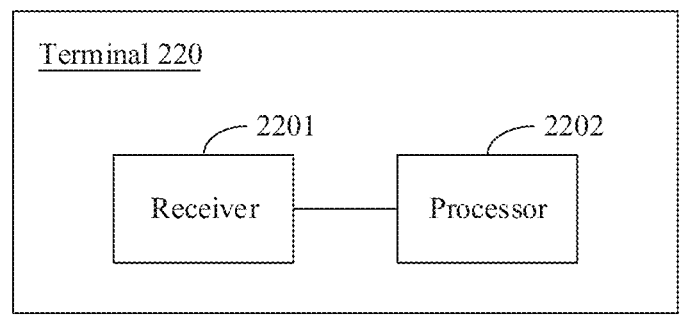
FIG. 22 is a schematic diagram of a hardware structure of a terminal according to an embodiment of this application.

FIG. 22 is a schematic diagram of a hardware structure of a terminal according to an embodiment of this application. As shown in FIG. 22, the terminal 220 includes a receiver 2201 and a processor 2202. The receiver 2201 and the processor 2202 may be directly connected, or may be connected by using a transmission bus or in another manner.

The receiver 2201 is configured to receive first information sent by a network device, where the first information is used to indicate that at least two active BWPs correspond to at least one first timer.

The processor 2202 is configured to set a value of a first timer that does not expire to an initial value based on the first information.

Optionally, the active BWPs each correspond to one first timer; and the processor 1902 is specifically configured to:

for any one of the active BWPs, if the terminal receives downlink control information DCI on the active BWP corresponding to a first timer that does not expire, set a value of the first timer that does not expire to an initial value based on the first information; or for any one of the active BWPs, if the terminal receives downlink control information DCI on the active BWP corresponding to a first timer that does not expire, set values of all first timers to initial values based on the first information.

Optionally, the receiver is further configured to receive second information sent by the network device, where the second information is used to indicate that at least one default bandwidth part BWP each corresponds to at least two active BWPs, and the first information is specifically used to indicate that the at least two active BWPs corresponding to the default BWP correspond to at least one first timer.

The processor 2202 is specifically configured to set a value of a first timer that does not expire in the at least one first timer corresponding to the at least two active BWPs corresponding to the default BWP, to an initial value based on the first information and the second information.

Optionally, the first information is specifically used to indicate that the active BWPs each correspond to one first timer; and the processor 2202 is specifically configured to:

for any one of the active BWPs, if the terminal receives downlink control information DCI on the active BWP corresponding to a first timer that does not expire, set a value of the first timer that does not expire to an initial value based on the first information and the second information; or for any one of the active BWPs, if the terminal receives downlink control information DCI on the active BWP corresponding to a first timer that does not expire, set values of all first timers corresponding to the at least two active BWPs corresponding to the default BWP, to initial values based on the first information and the second information.

Optionally, the first information is specifically used to indicate that at least two active BWPs corresponding to each of the default BWP correspond to one first timer.

The processor 2202 is specifically configured to: for any one of the active BWPs, if the terminal receives downlink control information DCI on the active BWP corresponding to a first timer that does not expire, set a value of the first timer corresponding to the at least two active BWPs corresponding to the default BWP, to an initial value based on the first information and the second information.

Optionally, the receiver is further configured to receive third information sent by the network device, where the third information is used to indicate that all active BWPs correspond to one second timer.

The processor 2202 is further configured to: if the terminal receives, before the second timer expires, downlink control information DCI on any one of the active BWPs corresponding to the second timer, set a value of the second timer to an initial value based on the third information.

Optionally, the receiver is further configured to receive fourth information sent by the network device, where the fourth information is used to indicate that at least two active BWPs corresponding to each default BWP correspond to one second timer.

The processor 2202 is further configured to: if the terminal receives, before the second timer expires, downlink control information DCI on any one of the active BWPs corresponding to the second timer, set a value of the second timer to an initial value based on the fourth information.

The terminal provided in this embodiment may be configured to perform the method performed by the terminal in Embodiment 2, and an implementation principle and a technical effect thereof are similar. Therefore, details are not described in this embodiment again.

Figure 23:
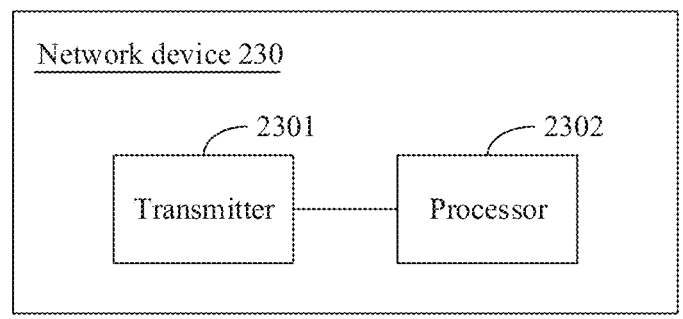
FIG. 23 is a schematic diagram of a hardware structure of a network device according to an embodiment of this application.

FIG. 23 is a schematic diagram of a hardware structure of a network device according to an embodiment of this application. As shown in FIG. 23, the network device includes a transmitter 2301 and a processor 2302. The transmitter 2301 and the processor 2302 may be directly connected, or may be connected by using a transmission bus or in another manner.

The transmitter 2301 is configured to send first information and second information to a terminal, where the first information is used to indicate that at least one default bandwidth part BWP each corresponds to at least two active BWPs, the second information is used to indicate that the at least two active BWPs correspond to at least one first timer, and the first timer is a timer used by the network device to determine a BWP to be deactivated by the terminal in the at least two active BWPs.

The processor 2302 is configured to: determine, based on the first information and the second information, a BWP to be deactivated by the terminal in the at least two active BWPs and a BWP to be activated by the terminal in the at least one default BWP, or determine, based on the first information and the second information, a BWP to be deactivated by the terminal in the at least two active BWPs.

Optionally, the first information is specifically used to indicate that one default BWP corresponds to at least two active BWPs, and the second information is specifically used to indicate that the active BWPs each correspond to one first timer.

The processor 2302 is specifically configured to: determine, based on the first information and the second information, that an active BWP corresponding to a first timer that expires is a to-be-deactivated BWP and the default BWP corresponding to the at least two active BWPs is a to-be-activated BWP, or determine, based on the first information and the second information, that an active BWP corresponding to a first timer that expires is a to-be-deactivated BWP.

Optionally, the first information is specifically used to indicate that at least two default BWPs each correspond to at least two active BWPs, and the second information is specifically used to indicate that the active BWPs each correspond to one first timer.

The processor 2302 is specifically configured to: for at least two active BWPs corresponding to any one of the default BWPs, determine, based on the first information and the second information, that an active BWP corresponding to a first timer that expires is a to-be-deactivated BWP and the default BWP corresponding to the at least two active BWPs is a to-be-activated BWP, or determine, based on the first information and the second information, that an active BWP corresponding to a first timer that expires is a to-be-deactivated BWP.

Optionally, the processor 2302 is specifically configured to:

if the active BWP corresponding to the first timer that expires is the last active BWP, determine that the active BWP corresponding to the first timer that expires is the to-be-deactivated BWP and the default BWP corresponding to the at least two active BWPs is the to-be-activated BWP; or if the active BWP corresponding to the first timer that expires is the first active BWP, determine that the active BWP corresponding to the first timer that expires is the to-be-deactivated BWP and the default BWP corresponding to the at least two active BWPs is the to-be-activated BWP.

Optionally, the processor 2302 is specifically configured to:

if the active BWP corresponding to the first timer that expires is not the last active BWP, determine that the active BWP corresponding to the first timer that expires is the to-be-deactivated BWP;

if the active BWP corresponding to the first timer that expires is not the first active BWP, determine that the active BWP corresponding to the first timer that expires is the to-be-deactivated BWP; or if the default BWP is active, determine that an active BWP corresponding to each first timer that expires is a to-be-deactivated BWP.

Optionally, the first information is specifically used to indicate that at least two default BWPs each correspond to at least two active BWPs, and the second information is specifically used to indicate that at least two active BWPs corresponding to each of the at least one default BWP correspond to one first timer.

The processor 2302 is specifically configured to: for at least two active BWPs corresponding to any one of the default BWPs, determine, based on the first information and the second information, that at least two active BWPs corresponding to a first timer that expires are to-be-activated BWPs and the default BWP is a to-be-activated BWP.

Optionally, the transmitter 2301 is further configured to send third information to the terminal, where the third information is used to indicate that all active BWPs correspond to one second timer, and the second timer is a timer used by the network device to determine a BWP to be deactivated by the terminal in all the active BWPs.

The processor 2302 is specifically configured to: when the second timer expires and there is a first timer that does not expire, determine, based on the first information, the second information, and the third information, that all active BWPs corresponding to the first timer that does not expire are to-be-deactivated BWPs and a default BWP corresponding to each of the active BWPs is a to-be-activated BWP.

Optionally, the transmitter 2301 is further configured to send fourth information to the terminal, where the fourth information is used to indicate that at least two active BWPs corresponding to each default BWP correspond to one second timer, and the second timer is a timer used by the network device to determine a BWP to be deactivated by the terminal in the at least two active BWPs corresponding to each default BWP.

The processor 2302 is specifically configured to: for each default BWP, when the second timer expires and there is a first timer that does not expire, determine, based on the first information, the second information, and the third information, that all active BWPs corresponding to the first timer that does not expire are to-be-deactivated BWPs and the default BWP is a to-be-activated BWP.

The network device provided in this embodiment may be configured to perform the method performed by the network device in Embodiment 1, and an implementation principle and a technical effect thereof are similar. Therefore, details are not described in this embodiment again.

Figure 24:
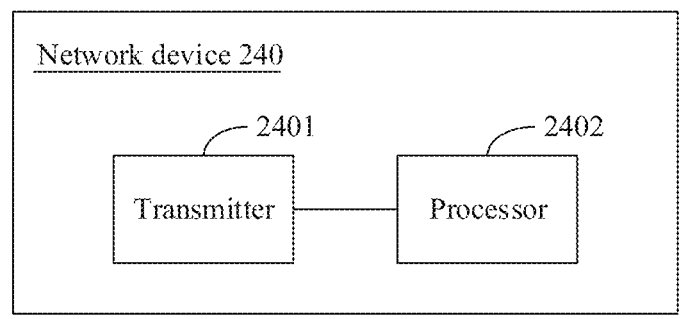
FIG. 24 is a schematic diagram of a hardware structure of a network device according to an embodiment of this application.

FIG. 24 is a schematic diagram of a hardware structure of a network device according to an embodiment of this application. As shown in FIG. 24, the network device includes a transmitter 2401 and a processor 2402. The transmitter 2401 and the processor 2402 may be directly connected, or may be connected by using a transmission bus or in another manner.

The transmitter 2401 is configured to send first information to a terminal, where the first information is used to indicate that at least two active BWPs correspond to at least one first timer.

The processor 2402 is configured to set a value of a first timer that does not expire to an initial value based on the first information.

Optionally, the processor 2402 is specifically configured to:

for any one of the active BWPs, if the network device sends downlink control information DCI on the active BWP corresponding to a first timer that does not expire, set a value of the first timer that does not expire to an initial value based on the first information; or for any one of the active BWPs, if the network device sends downlink control information DCI on the active BWP corresponding to a first timer that does not expire, set values of all first timers to initial values based on the first information.

Optionally, the transmitter 2401 is further configured to send second information to the terminal, where the second information is used to indicate that at least one default bandwidth part BWP each corresponds to at least two active BWPs, and the first information is specifically used to indicate that the at least two active BWPs corresponding to the default BWP correspond to at least one first timer.

The processor 2402 is specifically configured to set a value of a first timer that does not expire in the at least one first timer corresponding to the at least two active BWPs corresponding to the default BWP, to an initial value based on the first information and the second information.

Optionally, the first information is specifically used to indicate that the active BWPs each correspond to one first timer.

The processor 2402 is specifically configured to: for any one of the active BWPs, if the network device sends downlink control information DCI on the active BWP corresponding to a first timer that does not expire, set a value of the first timer that does not expire to an initial value based on the first information and the second information; or for any one of the active BWPs, if the network device sends downlink control information DCI on the active BWP corresponding to a first timer that does not expire, set values of all first timers corresponding to the at least two active BWPs corresponding to the default BWP, to initial values based on the first information and the second information.

Optionally, the first information is specifically used to indicate that at least two active BWPs corresponding to each of the default BWP correspond to one first timer.

The processor 2402 is specifically configured to: for any one of the active BWPs, if the network device sends downlink control information DCI on the active BWP corresponding to a first timer that does not expire, set a value of the first timer corresponding to the at least two active BWPs corresponding to the default BWP, to an initial value based on the first information and the second information.

Optionally, the transmitter 2401 is further configured to send third information to a terminal, where the third information is used to indicate that all active BWPs correspond to one second timer.

The processor 2402 is further configured to: if the network device sends, before the second timer expires, downlink control information DCI on any one of the active BWPs corresponding to the second timer, set a value of the second timer to an initial value based on the third information.

Optionally, the transmitter 2401 is further configured to send fourth information to the terminal, where the fourth information is used to indicate that at least two active BWPs corresponding to each default BWP correspond to one second timer.

The processor 2402 is further configured to: if the network device sends, before the second timer expires, downlink control information DCI on any one of the active BWPs corresponding to the second timer, set a value of the second timer to an initial value based on the fourth information.

The network device provided in this embodiment may be configured to perform the method performed by the network device in Embodiment 2, and an implementation principle and a technical effect thereof are similar. Therefore, details are not described in this embodiment again.

Figure 25:
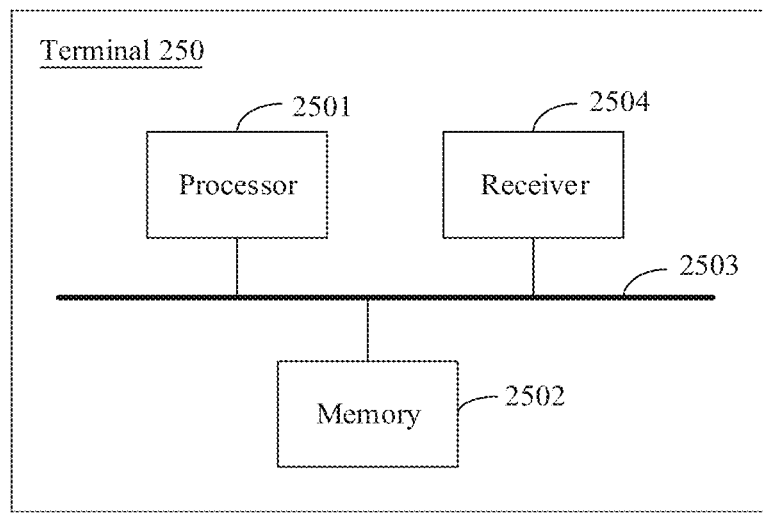
FIG. 25 is a schematic diagram of a hardware structure of a terminal according to an embodiment of this application.

FIG. 25 is a schematic diagram of a hardware structure of a terminal according to an embodiment of this application. As shown in FIG. 25, the terminal 250 includes a processor 2501 and a memory 2502.

The memory 2502 is configured to store a computer program.

The processor 2501 is configured to execute the computer program stored in the memory, to implement the steps performed by the terminal in Embodiment 1 to Embodiment 3. For details, refer to related descriptions in the foregoing method embodiments.

Optionally, the memory 2502 may be independent, or may be integrated with the processor 2501.

When the memory 2502 is a component independent of the processor 2501, the terminal 250 may further include:

a bus 2503, configured to connect the memory 2502 and the processor 2501.

The terminal shown in FIG. 25 may further include a receiver 2504, configured to receive first information and second information, third information, fourth information, and the like.

The terminal provided in this embodiment may be configured to perform the method performed by the terminal in Embodiment 1 to Embodiment 3, and an implementation principle and a technical effect thereof are similar. Therefore, details are not described in this embodiment again.

Figure 26:
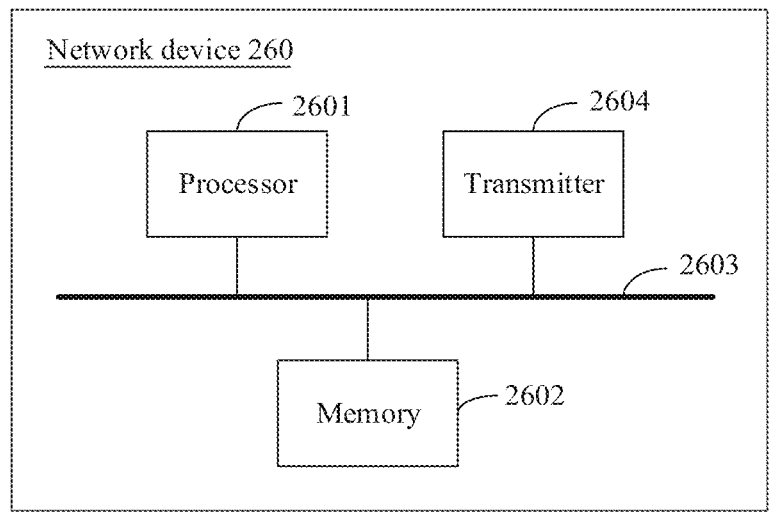
FIG. 26 is a schematic diagram of a hardware structure of a network device according to an embodiment of this application.

FIG. 26 is a schematic diagram of a hardware structure of a network device according to an embodiment of this application. As shown in FIG. 26, the network device 260 includes a processor 2601 and a memory 2602.

The memory 2602 is configured to store a computer program.

The processor 2601 is configured to execute the computer program stored in the memory, to implement the steps performed by the network device in Embodiment 1 to Embodiment 3. For details, refer to related descriptions in the foregoing method embodiments.

Optionally, the memory 2602 may be independent, or may be integrated with the processor 2601.

When the memory 2602 is a component independent of the processor 2601, the network device 260 may further include:

a bus 2603, configured to connect the memory 2602 and the processor 2601.

The network device shown in FIG. 26 may further include a transmitter 2604, configured to send first information and second information, third information, fourth information, and the like.

The network device provided in this embodiment may be configured to perform the method performed by the network device in Embodiment 1 to Embodiment 3, and an implementation principle and a technical effect thereof are similar. Therefore, details are not described in this embodiment again.

An embodiment of this application further provides a storage medium. The storage medium includes a computer program. The computer program is used to implement the bandwidth part processing method performed on the terminal side in the foregoing embodiments.

An embodiment of this application further provides a storage medium. The storage medium includes a computer program. The computer program is used to implement the bandwidth part processing method performed on the network device side in the foregoing embodiments.

An embodiment of this application further provides a chip, including a memory, a processor, and a computer program. The computer program is stored in the memory. The processor runs the computer program to perform the bandwidth part processing method performed on the terminal side in the foregoing embodiments.

An embodiment of this application further provides a chip, including a memory, a processor, and a computer program. The computer program is stored in the memory. The processor runs the computer program to perform the bandwidth part processing method performed on the network device side in the foregoing embodiments.

In the several embodiments provided in the present invention, it should be understood that the disclosed device and method may be implemented in other manners. For example, the described device embodiments are merely examples. For example, division into the modules is merely logical function division and may be other division in an actual implementation. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electric, mechanical, or other forms.

The modules described as separate parts may or may not be physically separate, and parts displayed as modules may or may not be physical units, may be located in one position, or may be distributed on a plurality of network units. Some or all of the modules may be selected based on an actual requirement to achieve the objectives of the solutions of the embodiments.

In addition, function modules in the embodiments of the present invention may be integrated into one processing unit, or each of the modules may exist alone physically, or two or more modules may be integrated into one unit. The unit integrated from the modules may be implemented in a form of hardware, or may be implemented in a form of hardware in addition to a software functional unit.

When the foregoing integrated module is implemented in a form of a software functional module, the integrated module may be stored in a computer-readable storage medium. The software functional module is stored in a storage medium and includes several instructions for instructing a computer device (which may be a personal computer, a server, a network device, or the like) or a processor (English: processor) to perform some steps of the methods described in the embodiments of this application.

It should be understood that the processor may be a central processing unit (English: Central Processing Unit, CPU for short), or may be another general-purpose processor, a digital signal processor (English: Digital Signal Processor, DSP for short), an application-specific integrated circuit (English: Application Specific Integrated Circuit, ASIC for short), or the like. The general-purpose processor may be a microprocessor, or the processor may be any conventional processor or the like. The steps of the methods disclosed with reference to the present invention may be directly performed by a hardware processor, or may be performed by using a combination of hardware of the processor and a software module.

The memory may include a high-speed RAM memory, or may further include a non-volatile memory NVM, for example, at least one magnetic disk memory. Alternatively, the memory may be a USB flash drive, a removable hard disk, a read-only memory, a magnetic disk, an optical disc, or the like.

The bus may be an industry standard architecture (Industry Standard Architecture, ISA) bus, a peripheral component interconnect (Peripheral Component, PCI) bus, an extended industry standard architecture (Extended Industry Standard Architecture, EISA) bus, or the like. The bus may be classified into an address bus, a data bus, a control bus, and the like. For ease of representation, the bus in the accompanying drawings of this application is not limited to only one bus or only one type of bus.

The storage medium may be implemented by any type of volatile or non-volatile storage device or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic disk, or an optical disc. The storage medium may be any available medium accessible to a general-purpose or special-purpose computer.

For example, a storage medium is coupled to a processor, so that the processor can read information from the storage medium, and can write information into the storage medium. Certainly, the storage medium may alternatively be a component of the processor. The processor and the storage medium may be located in an application-specific integrated circuit (Application Specific Integrated Circuits, ASIC for short). Certainly, the processor and the storage medium may alternatively exist in an electronic device or a controlling device as discrete components.

What is claimed is:

1. A bandwidth part processing method, comprising:
   receiving, by a terminal, a first information and a second information from a network device, wherein the first information indicates that at least one default bandwidth part (BWP) corresponds to at least two active BWPs, the second information indicates that the at least two active BWPs correspond to at least one first timer, and the at least one first timer is useable by the terminal to perform deactivation processing on at least one of the at least two active BWPs;
   receiving, by the terminal, a third information from the network device, wherein the third information indicates that all active BWPs correspond to a second timer, and the single second timer is useable by the terminal to perform deactivation processing on the all active BWPs corresponding to a first timer that fails to expire; and
   performing, by the terminal, deactivation processing on the at least one of the at least two active BWPs, and activation processing on a BWP in the at least one default BWP based on the first information and the second information, or
   performing deactivation processing on the at least one of the at least two active BWPs based on the first information and the second information;
   wherein the performing, by the terminal, deactivation processing on the at least one of the at least two active BWPs, and activation processing on the BWP in the at least one default BWP based on the first information and the second information comprises:
      performing, by the terminal based on the first information, the second information, and the third information, deactivation processing on the all active BWPs corresponding to the first timer that fails to expire, and activation processing on the one default BWP corresponding to the at least two active BWPs in response to the second timer that expires and the first timer that fails to expire.

2. The method according to claim 1, wherein the first information indicates that one default BWP corresponds to the at least two active BWPs, and the second information indicates that each of the active BWPs corresponds to the first timer; and
   the performing, by the terminal, deactivation processing on the at least one of the at least two active BWPs, and activation processing on the BWP in the at least one default BWP based on the first information and the second information, comprises:
      performing, by the terminal based on the first information and the second information, deactivation processing on an active BWP of the active BWPs corresponding to the first timer that expires and activation processing on the one default BWP corresponding to the at least two active BWPs, or
   the performing deactivation processing on the at least one of the at least two active BWPs based on the first information and the second information comprises:
      performing, based on the first information and the second information, deactivation processing on the active BWP of the active BWPs corresponding to the single first timer that expires.

3. The method according to claim 2, wherein the performing, by the terminal based on the first information and the second information, deactivation processing on the active BWP of the active BWPs corresponding to the first timer that expires, and activation processing on the one default BWP corresponding to the at least two active BWPs comprises:
   performing, by the terminal, deactivation processing on the active BWP of the active BWPs corresponding to the first timer that expires, and activation processing on the one default BWP corresponding to the at least two active BWPs in response to the active BWP of the active BWPs corresponding to the first timer that expires is a last active BWP of the active BWPs; or
   performing, by the terminal, deactivation processing on the active BWP of the active BWPs corresponding to the first timer that expires, and activation processing on the one default BWP corresponding to the at least two active BWPs in response to the active BWP of the active BWPs corresponding to the first timer that expires is a first active BWP of the active BWPs.

4. The method according to claim 2, wherein the performing, by the terminal based on the first information and the second information, deactivation processing on the active BWP of the active BWPs corresponding to the first timer that expires comprises:
   performing, by the terminal, deactivation processing on the active BWP of the active BWPs corresponding to the first timer that expires in response to the active BWP of the active BWPs corresponding to the first timer that expires and fails to be a last active BWP of the active BWPs; or
   performing, by the terminal, deactivation processing on the active BWP of the active BWPs corresponding to the first timer that expires in response to the active BWP of the active BWPs corresponding to the first timer that expires and fails to be a first active BWP of the active BWPs; or performing, by the terminal, deactivation processing on the active BWP of the active BWPs corresponding to the first timer that expires in response to the one default BWP being active.

5. The method according to claim 1, wherein the first information indicates that each of the at least two default BWPs corresponds to the at least two active BWPs, and the second information indicates that each of the active BWPs corresponds to the first timer; and the performing, by the terminal, deactivation processing on the at least one of the at least two active BWPs, and activation processing on the BWP in the at least one default BWP based on the first information and the second information, comprises:

for at least two active BWPs corresponding to one of the default BWPs, performing, by the terminal based on the first information and the second information, deactivation processing on an active BWP of the active BWPs corresponding to the first timer that expires, and activation processing on the one of the default BWPs corresponding to the at least two active BWPs, or the performing deactivation processing on the at least one of the at least two active BWPs based on the first information and the second information comprises:

performing, based on the first information and the second information, deactivation processing on the active BWP of the active BWPs corresponding to the first timer that expires.

6. The method according to claim 5, wherein the method further comprises:

receiving, by the terminal, a fourth information from the network device, wherein the fourth information indicates that the at least two active BWPs corresponding to each of the at least two default BWPs further correspond to the second timer, and the second timer is useable by the terminal to perform deactivation processing on another active BWP of the active BWPs that corresponds to each of the at least two default BWPs, and that further corresponds to the first timer that fails to expire; and the performing, by the terminal, deactivation processing on the at least one of the at least two active BWPs, and activation processing on the BWP in the at least one default BWP based on the first information and the second information further comprises:

for each of the at least two default BWPs, performing, by the terminal based on the first information, the second information, and the third information, deactivation processing on all active BWPs that corresponds to the first timer that fails to expire, and activation processing on the at least two default BWPs in response to the second timer expiring and the first timer that fails to expire.

7. The method according to claim 1, wherein the first information indicates that each of at least two default BWPs corresponds to at least two active BWPs, and the second information indicates that the at least two active BWPs corresponds to the first timer; and the performing, by the terminal, deactivation processing on the at least one of the at least two active BWPs, and activation processing on a BWP in the at least one default BWP based on the first information and the second information comprises:

for at least two active BWPs corresponding to one of the at least two default BWPs, performing, by the terminal based on the first information and the second information, deactivation processing on the at least two active BWPs corresponding to the first timer that expires, and activation processing on the one of the at least two default BWPs.

8. A terminal, comprising:

a receiver; and a processor, wherein the receiver is connected to the processor;

the receiver is configured to receive a first information and a second information from a network device, wherein the first information indicates that at least one default bandwidth part (BWP) corresponds to at least two active BWPs, the second information indicates that the at least two active BWPs correspond to at least one first timer, and the at least one first timer is useable by the terminal to perform deactivation processing on at least one of the at least two active BWPs;

the receiver is further configured to receive a third information from the network device, wherein the third information indicates that all active BWPs correspond to a second timer, and the second timer is useable by the terminal to perform deactivation processing on the all active BWPs corresponding to a first timer that fails to expire; and the processor is configured to:

perform deactivation processing on the at least one of the at least two active BWPs, and activation processing on a BWP in the at least one default BWP based on the first information and the second information, or perform deactivation processing on the at least one of the at least two active BWPs based on the first information and the second information; and the processor is further configured to perform, based on the first information, the second information, and the third information, deactivation processing on the all active BWPs corresponding to the first timer that fails to expire, and activation processing on the one default BWP corresponding to the at least two active BWPs in response to the second timer that expires and the first timer that fails to expire.

9. The terminal according to claim 8, wherein the first information indicates that one default BWP corresponds to the at least two active BWPs, and the second information indicates that each of the active BWPs corresponds to the first timer; and the processor configured to perform deactivation processing on the at least one of the at least two active BWPs, and activation processing on the BWP in the at least one default BWP comprises the processor being further configured to:

perform, based on the first information and the second information, deactivation processing on an active BWP of the active BWPs corresponding to the first timer that expires, and activation processing on the one default BWP corresponding to the at least two active BWPs, or the processor configured to perform deactivation processing on the at least one of the at least two active BWPs based on the first information and the second information comprises the processor being further configured to:

perform, based on the first information and the second information, deactivation processing on the active BWP of the active BWPs corresponding to the first timer that expires.

10. The terminal according to claim 9, wherein the processor is further configured to:
perform deactivation processing on the active BWP of the active BWPs corresponding to the first timer that expires, and activation processing on the one default BWP corresponding to the at least two active BWPs in response to the active BWP of the active BWPs corresponding to the first timer that expires is a last active BWP of the active BWPs; or
perform deactivation processing on the active BWP of the active BWPs corresponding to the first timer that expires, and activation processing on the one default BWP corresponding to the at least two active BWPs in response to the active BWP of the active BWPs corresponding to the first timer that expires is a first active BWP of the active BWPs.

11. The terminal according to claim 9, wherein the processor is further configured to:
perform deactivation processing on the active BWP of the active BWPs corresponding to the first timer that expires in response to the active BWP of the active BWPs corresponding to the first timer that expires and fails to be a last active BWP of the active BWPs;
perform deactivation processing on the active BWP of the active BWPs corresponding to the first timer that expires in response to the active BWP of the active BWPs corresponding to the first timer that expires and fails to be a first active BWP of the active BWPs; or
perform deactivation processing on the active BWP of the active BWPs corresponding to the first timer that expires in response to the one default BWP being active.

12. The terminal according to claim 8, wherein the first information indicates that each of the at least two default BWPs corresponds to the at least two active BWPs, and the second information indicates that each of the active BWPs corresponds to the first timer; and
the processor configured to perform deactivation processing on the at least one of the at least two active BWPs, and activation processing on the BWP in the at least one default BWP comprises the processor being further configured to:
for at least two active BWPs corresponding to one of the default BWPs, perform, based on the first information and the second information, deactivation processing on an active BWP of the active BWPs corresponding to the first timer that expires, and activation processing on the one of the default BWPs corresponding to the at least two active BWPs, or the processor configured to perform deactivation processing on the at least one of the at least two active BWPs based on the first information and the second information comprises the processor being further configured to:
perform, based on the first information and the second information, deactivation processing on the active BWP of the active BWPs corresponding to the first timer that expires.

13. The terminal according to claim 12, wherein
the receiver is further configured to receive a fourth information from the network device, wherein the fourth information indicates that the at least two active BWPs corresponding to each of the at least two default BWPs further correspond to the second timer, and the second timer is useable by the terminal to perform deactivation processing on another active BWP of the active BWPs that corresponds to each of the at least two default BWPs, and that further corresponds to the first timer that fails to expire; and
the processor is further configured to, for each of the at least two default BWPs, perform, based on the first information, the second information, and the third information, deactivation processing on all active BWPs that corresponds to the first timer that fails to expire, and activation processing on the at least two default BWPs in response to the second timer expiring and the first timer that fails to expire.

14. The terminal according to claim 8, wherein the first information indicates that each of at least two default BWPs corresponds to at least two active BWPs, and the second information indicates that the at least two active BWPs corresponds to the first timer; and
the processor configured to perform deactivation processing on the at least one of the at least two active BWPs, and activation processing on the BWP in the at least one default BWP based on the first information and the second information comprises the processor being further configured to:
for at least two active BWPs corresponding to one of the at least two default BWPs, perform, based on the first information and the second information, deactivation processing on the at least two active BWPs corresponding to the first timer that expires, and activation processing on the one of the at least two default BWPs.

* * * * *